US006728400B1

(12) United States Patent
Matsugu

(10) Patent No.: US 6,728,400 B1
(45) Date of Patent: Apr. 27, 2004

(54) APPARATUS, METHOD, AND STORAGE MEDIUM FOR SETTING AN EXTRACTION AREA IN AN IMAGE

(75) Inventor: Masakazu Matsugu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 09/628,024

(22) Filed: Jul. 28, 2000

(30) Foreign Application Priority Data

Jul. 30, 1999 (JP) .......................................... 11-216664

(51) Int. Cl.[7] ................................................ G06K 9/00
(52) U.S. Cl. ........................ 382/164; 382/165; 382/180
(58) Field of Search ................................ 382/162, 164, 382/165, 173, 180, 107, 199, 203, 243, 266, 270, 286; 345/501; 348/155; 358/453, 462

(56) References Cited

U.S. PATENT DOCUMENTS

| 5,471,535 | A | * | 11/1995 | Ikezawa et al. ............. 382/199 |
| 5,659,490 | A | | 8/1997 | Imamura |
| 5,864,630 | A | * | 1/1999 | Cosatto et al. .............. 382/103 |
| 6,058,211 | A | * | 5/2000 | Bormans et al. ............ 382/235 |
| 6,075,875 | A | * | 6/2000 | Gu .............................. 382/107 |
| 6,167,167 | A | * | 12/2000 | Matsugu et al. ............ 382/283 |
| 6,335,985 | B1 | * | 1/2002 | Sambonsugi et al. ....... 382/190 |
| 6,337,917 | B1 | * | 1/2002 | Onural et al. ................ 382/107 |
| 6,404,936 | B1 | * | 6/2002 | Katayama et al. .......... 382/283 |
| 6,466,693 | B1 | * | 10/2002 | Otsu et al. .................. 382/176 |

FOREIGN PATENT DOCUMENTS

| JP | 6-149959 | 5/1994 |
| JP | 7-34219 | 2/1995 |
| JP | 7-322054 | 12/1995 |
| JP | 7-334675 | 12/1995 |
| JP | 8-7107 | 1/1996 |
| JP | 8-16779 | 1/1996 |
| JP | 9-6961 | 1/1997 |
| JP | 2642368 | 5/1997 |

OTHER PUBLICATIONS

Pavlidis et al, Integrating region growing and edge detection, IEEE Transactions on PAttern Analysis and Machine Intelligence, Mar. 1990, vol 12, iss 3, p 225–233.*

Farrokhnia et al, A multi–channel filtering approach to texture segmentation, Proceedings of the IEEE Computer Society Conference on Computer Vision and Pattern Recognition, Jun. 3–6, 1991, p 364–370.*

(List continued on next page.)

Primary Examiner—Bhavesh M. Mehta
Assistant Examiner—Christopher Sukhaphadhana
(74) Attorney, Agent, or Firm—Fitzpatrick, Cella, Harper & Scinto

(57) ABSTRACT

An initial core setting device sets the point or area designated by a indication selecting device as a core of area growth. A characteristic amount extraction device extracts a color component value of each pixel of an input image, edge strength value regarding density (lightness), contrast component regarding lightness or texture characteristic amount. A representative color extraction device extracts the color component characteristic amount of the representative color from a point on the initial core. An area dividing device labels as a continuous area the pixel with small difference between one of representative colors and the color component, and generates image dividing data designating individual areas. An area growth/reduction device, in accordance with user's indication, merges into or excludes from an attention area the set initial core area or each point in the area neighbouring the boundary in the area whose shape is changed, based on image characteristic amount or image dividing data. A shape display data generation device generates data for display showing the shape of area which is obtained In the process of (or as a result of) area growth. An image based on generated data for display is superimposed on the input image to be displayed.

47 Claims, 18 Drawing Sheets

OTHER PUBLICATIONS

Dubuisson et al, Object contour extraction using color and motion, Proceedings of the IEEE Computer Society Conference on Computer Vision and Pattern Recognition, Jun. 15–17, 1993, p 471–476.*

Belongie et al, Color–and texture–based image segmentation usgin EM and its application to content–based image retrieval, Sixth International Conference on Computer Vision, Jan. 4–7, 1998, p 675–682.*

"Texture Features for Browsing and Retrieval of Image Data", B.S. Manjunath, et al., IEEE Transactions of Pattern Analysis and Machine Intelligence, vol. 18, No. 8, pp. 837–842, Aug., 1996.

"Determining Optical Flow", B.K.P. Horn, et al., Artificial Intelligence, vol. 17, No. 1, pp. 185–203, North–Holland Publishing Company, Amsterdam, Aug. 1981.

* cited by examiner

OUTLINE AFTER GROWTH

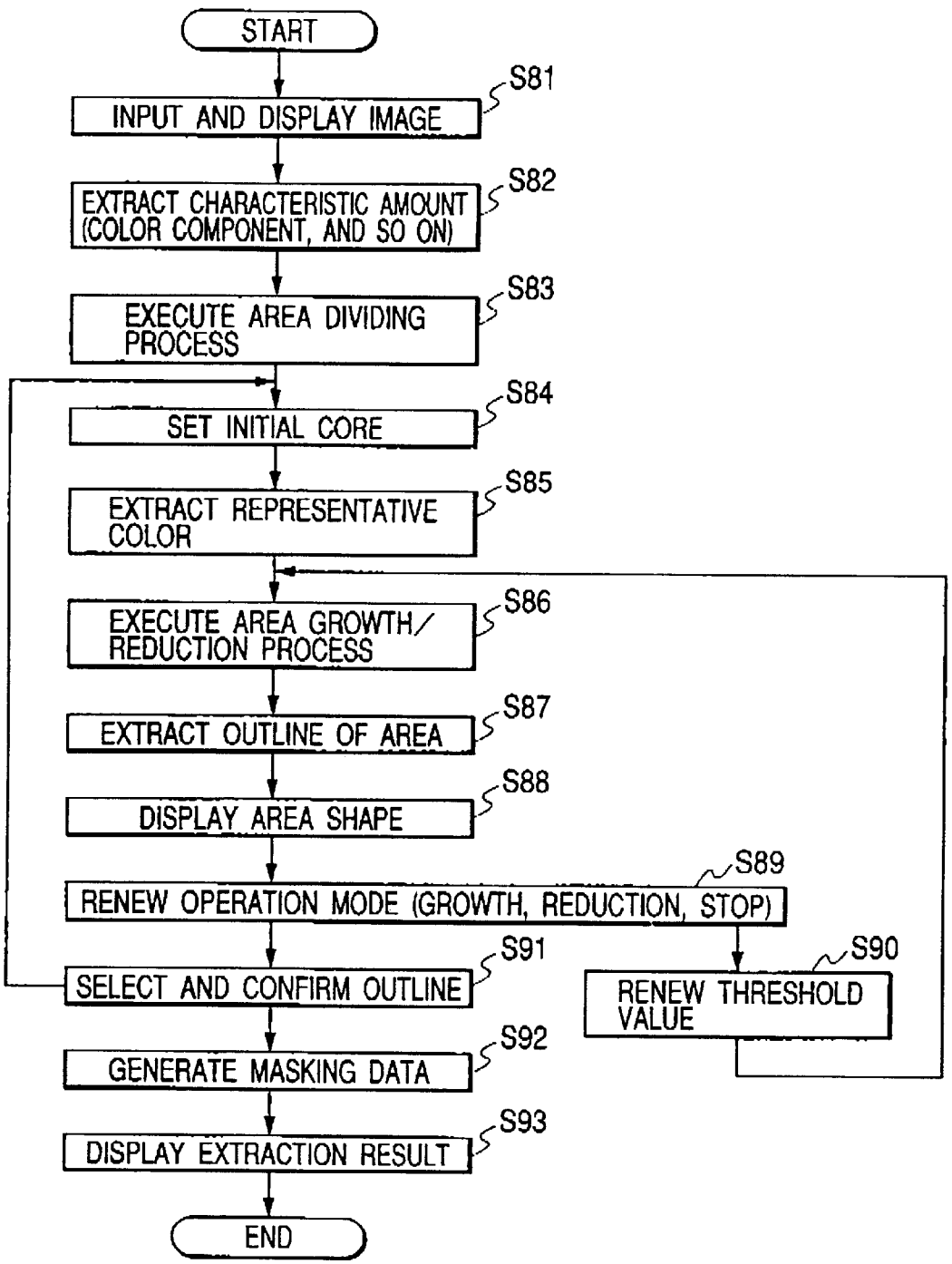

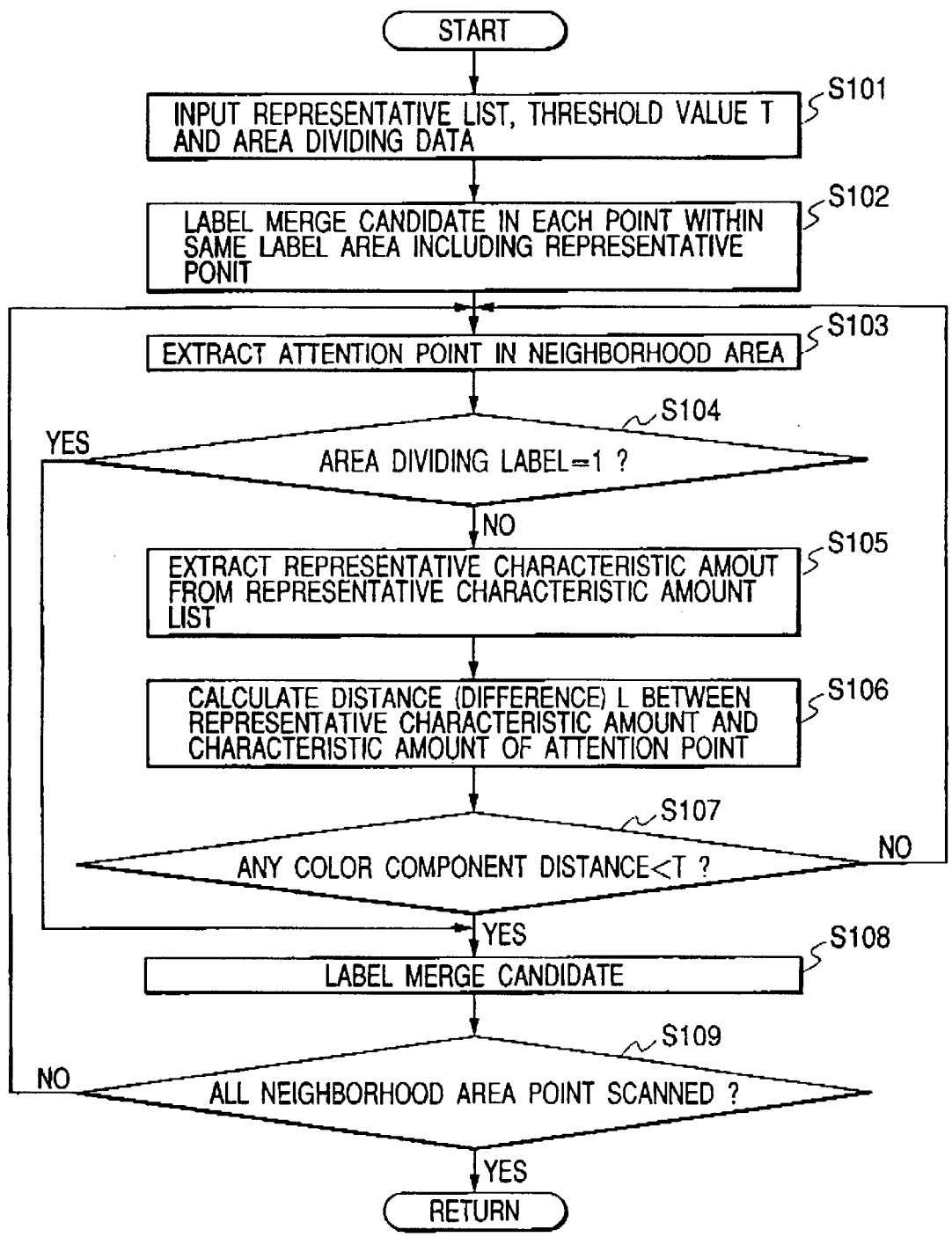

APPARATUS, METHOD, AND STORAGE MEDIUM FOR SETTING AN EXTRACTION AREA IN AN IMAGE

BACKGROUND OF THE INVENTION

1. Field of the Invention

This invention relates to an image processing apparatus, an image processing method and a storage medium.

2. Related Background Art

Conventionally, processes for extracting a specific subject image from an image include a method in which removal of backgrounds or the area designation of extraction subjects is repeated while selecting areas that have color component values in a predetermined range including pixel values of the point on the subject or background designated by a user (Japanese Patent Application Laid-Open No. 8-7107 and Japanese Patent Application Laid-Open No. 8-16779, etc.), a method in which the degree of color change of an image is examined, thereby determining the color range of a background area to obtain the background area (Japanese Patent Application Laid-Open No. 7-334675), a method in which an image is divided by color quantizing means into areas for each similar color and adjacent areas are integrated for area dividing based on the similarity of space frequency components and color components extracted for each local area (Japanese Patent Application Laid-Open No. 6-149959), and an interested area designation method in which the position of a representative point is set in an image, areas whose optical density of image is almost equal to that at the representative point are selected, and the size of those areas is optionally changed by operation (Japanese Patent Publication No. 7-34219).

In addition, a method in which only a closing curve (or boundary of polygon) is set in such a way that an image portion to be clipped is roughly enclosed to generate a clipped image almost the same in shape as the subject (U.S. Pat. No. 2,642,368 and Japanese Patent Application Laid-Open No. 7-322054), and a method in which the shape of an area is determined by executing an expansion process of generating an initial closing curve inside the subject to be clipped and shifting linearly and outwardly a sampling point location to a characteristic point such as an edge in a radial direction passing through the sampling point from the center (Japanese Patent Application Laid-Open No. 9-6961) are included.

However, the method in which the extraction subject is designated while selecting areas that have color component values in a predetermined range (Japanese Patent Application Laid-Open No. 8-7107 and Japanese Patent Application Laid-Open No. 8-16779) has disadvantages that much effort is needed (such as designation of color component selection ranges and of the points in the extraction subject) in the case where the subject includes local areas having many color components, and where it is difficult to distinguish between the background and the subject by using pixel values alone because the boundary between them is of low contrast.

The method described in Japanese Patent Application Laid-Open No. 7-334675 is subject to constraints that the area of the background should be sufficiently large and the representative color of the background area should be sufficiently different from that of the extraction subject, and is therefore lacking in general versatility.

The method described in Japanese Patent Application Laid-Open No. 6-149959 has disadvantages that extraction accuracy is significantly reduced in the case where the area neighboring the outline of the extraction subject is in a low contrast portion in which the change of color components is gradual and where the changes of both space frequencies and color components are gradual.

The method described in Japanese Patent Publication No. 7-34219 has disadvantages that it is difficult to extract the shape accurately and process speed is low in the case where the area neighboring the boundary between the extraction subject and the background is in an area in which the change of gray values is gradual.

The method based on the proportion of areas having same color components included in the closing curve (U.S. Pat. No. 2,642,368) is apt to result in erroneous extraction such as extraction of background portions in the case where there is an area in the background in the closing curve that has same color as the subject and where the area of the closing curve is twice or more as large as the area to be clipped.

In the method on the basis of subject recognition process and outline recognition process, under the present circumstance, recognition of the subject or recognition of the outline is generally difficult, and there is a precondition for example that the subject can be recognized based on specific color components or that the outline can be recognized due to the absence in the closing curve of the outline of other objects and the like except for the outline of the subject to be clipped, which results in lack of general versatility.

In the area dividing method using an expansion process of the closing curve generated inside the subject to be clipped, although high speed process is possible, there is a disadvantage that it is generally necessary to set a large number of closing curves at the appropriate position in the subject area, and executing the setting automatically is difficult and setting via human intervention requires excess efforts.

SUMMARY OF THE INVENTION

The present invention is intended to provide an image extracting method and device and storage medium to solve these problems.

A suitable example of the present invention on the basis of the aforesaid purpose is characterized in that it includes an inputting step of inputting an image, an area dividing step of dividing the image into a plurality of areas based on predetermined characteristic amount to generate dividing data, a representative position designating step of designating on the image a representative position composed of at least one point, a shape changing step of changing a shape of a predetermined continuous area including the representative position by referring to the dividing data, displaying step of displaying the continuous area whose shape is changed, and an extraction area determining step of determining the continuous area after change as an extraction area.

Furthermore, the example is characterized in that it has an inputting step of inputting an image, an area dividing step of dividing the image into a plurality of areas based on a first characteristic amount to generate dividing data, a representative position designating step of designating on the image a representative position composed of at least one point, a shape changing step of changing the shape of a predetermined continuous area including the representative position by referring to at least one of the dividing data and a second characteristic amount, a displaying step of displaying the continuous area whose shape is changed, and an extraction area setting step of setting the continuous area after the change as an extraction area.

By this configuration, in the process of deforming the initial area (including points and lines) and extracting the subject, the rough shape of the extraction subject can be extracted at high speed, and its detailed shape can be obtained with stability and high accuracy.

The shaped changing step refers to dividing data and a predetermined image characteristic amount. The image characteristic amount is for example a color component characteristic amount at each point in the image, a contrast characteristic amount, an edge strength characteristic amount or a texture characteristic amount.

The image characteristic amount referred to at a predetermined point in the image in the shape changing step is a color component characteristic amount in the case where saturation is a predetermined threshold value or more, and is a contrast characteristic amount, an edge strength characteristic amount or a lightness characteristic amount in the case where the saturation is less than a predetermined threshold value. By this, the outline of a subject and a clipped image can be obtained.

The image predetermined characteristic amount referred to at a predetermined point in the image in the shape changing step may be the weighted average amount of a first characteristic amount being a color component at the point and a second characteristic amount being one of a contrast component, an edge strength component and a light component.

The area dividing step includes a step of extracting at least one representative color component characteristic amount at a representative position composed of at least one point in the image, and a labeling step of adding a first labeling value in the case where at least one of each color space distance defined between color component characteristic amount at each point in the image and each representative color component characteristic amount is a predetermined threshold value or less, and adding a second labeling value in the case where the color space distance is larger than the threshold value, thereby generating the labeling data as dividing data.

The area dividing step may also determine a predetermined two valued threshold value based on the histogram of optical density of image and generate as dividing data the two valued data of the image according to the threshold value. By this, the rough shape (or the detailed shape) of the subject can be obtained at high speed and with high accuracy.

The color component characteristic amount may be chromaticity. Thus, the process efficiency can be improved and high accuracy extraction for extracting areas with hue and saturation in the same category is possible.

Furthermore, the example is characterized in that it has an image inputting unit, an area dividing unit for dividing the image inputted by the image inputting unit into a plurality of areas based on predetermined characteristic amount to generate dividing data, a representative position designating unit for designating on the image a representative position composed of at least one point, a shape changing unit for changing the shape of a predetermined continuous area including the representative position by referring to the dividing data, a displaying unit for displaying the continuous area whose shape is changed, and an extraction area determining unit for determining the continuous area after change as an extraction area.

Furthermore, the example is characterized in that it includes of an inputting step of inputting an image, an area dividing step of dividing the image into a plurality of areas based on predetermined characteristic amount to generate dividing data, a representative position designating step of designating on the image a representative position composed of at least one point, a shape changing step of changing the shape of a predetermined continuous area including the representative position by referring to the dividing data, displaying step of displaying the continuous area whose shape is changed, a convergence determining step of determining the convergence of shape changing by the shape changing step, and an extraction area setting step of setting the continuous area after change as an extraction area.

Furthermore, the example is characterized in that it has an inputting unit for inputting an image, area dividing means for dividing the image inputted by the image inputting unit into a plurality of areas based on predetermined characteristic amount to generate dividing data, a designating unit for designating on the image a representative position composed of at least one point, a shape changing unit for changing the shape of a predetermined continuous area including the representative position by referring to the dividing data, a displaying unit for displaying the continuous area whose shape is changed, a convergence determining unit for determining the convergence of the shape changing by the shape changing unit and an extraction area setting unit for setting the continuous area after change as an extraction area.

In a storage medium related to the present invention, the program of the aforesaid image processing method is stored.

The present invention relates to an image processing device and an image processing method and a storage medium that have new functions.

Further functions and features of the present invention will be apparent from the following drawings and examples.

BRIEF DESCRIPTION OF THE DRAWINGS

FIG. 17 is a flowchart of a fourth example; and

FIG. 18 is a detailed flowchart of the area growth/reduction process (S86).

DETAILED DESCRIPTION OF THE PREFERRED EMBODIMENTS

EXAMPLES

Figure 1:
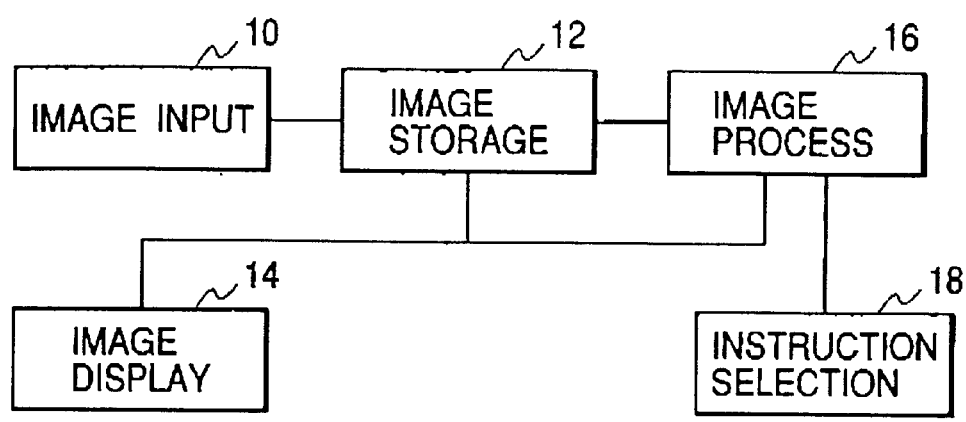
FIG. 1 is a system block diagram of an image extraction device according to the present invention.

In the following, examples of the present invention will be described in detail referring to the drawings.

First Example

FIG. 1 shows a schematic block diagram of a first example of the present invention. 10 is an image input device, 12 is an image storage device, 14 is an image display device such as CRTs, crystal liquid, etc., 16 is an image processing device, and 18 is a indication selecting device such as a mouse.

Image data including an extraction subject is inputted using the image input device 10. The inputted image is stored in the image storage device 12, and is displayed on the screen of the image displaying device 14. The image input device 10 is for example an image scanner, a digital photo device or an image data transfer device connected to an image database and the like. The image display device 14 is used for displaying the input image and displaying the outline of the area growth/reduction process and the image of extraction results described later.

Figure 2:
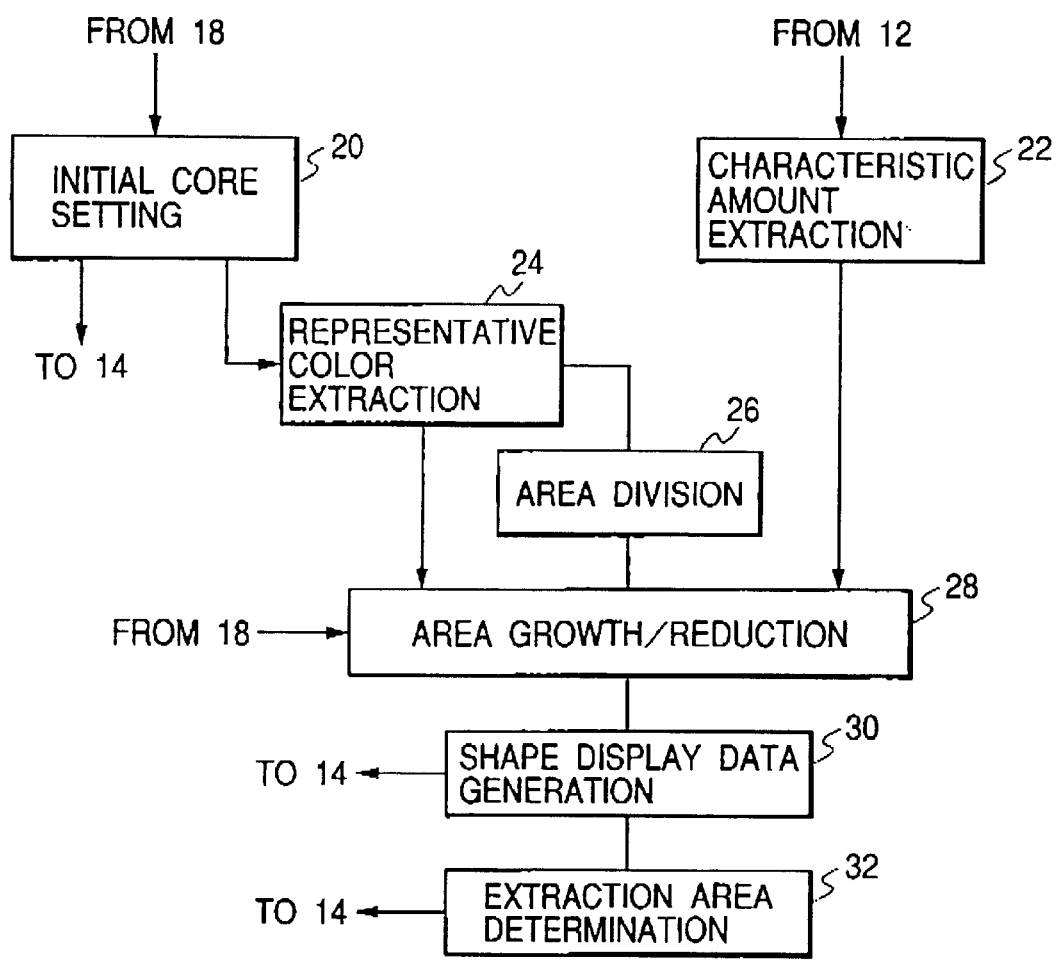
FIG. 2 is a schematic block diagram showing an example of a first configuration of an image processing device 16.

FIG. 2 shows a schematic block diagram of the image processing device 16. 20 is an initial core setting device that sets an initial core in response to the operation of the indication selecting device 18, 22 is a characteristic amount extraction devise that extracts characteristic amount such as chromaticity, contrast, edge strength end texture characteristic amount of the input image stored in the image storage device 12. 24 is a representative color extraction device, 26 is an area dividing device, 28 is an area growth/reduction device, 30 is a shape display data generation device that generates display data of the shape of the extraction area (the area in a deformation process), and 32 is an extraction area determination device. The image processing device 16 comprises a primary storage device for storing a variety of data, not shown in the drawing.

The initial core setting device 20 sets a point or an area on a point or a line (curve) designated by the indication selecting device 18.

The characteristic amount extraction device 22 extracts a color component value of each pixel (each component value of RGB, each component value of chromaticity, or each component value of hue/saturation/lightness), an edge strength value regarding optical density (lightness) of the input image, a contrast component regarding lightness (described later), or texture characteristic amount from the input images.

The representative color extraction device 24 extracts color component characteristic amount of the representative color from the point in the initial core. In the case where the initial core forms a line or an area, the representative color extraction device 24 usually extracts a plurality of representative colors.

The area dividing device 26 generates image dividing data designating individual areas by labeling as a continuous area the pixel with small difference between one of representative colors and its color component (or for individual color components).

The area growth/reduction device 28 merges into and excludes from an attention area each point in the area neighboring the boundary of the set initial core area (or the area whose shape is changed), based on the aforesaid image characteristic amount or image dividing data, in accordance with the indication from the user (for example, operation of left and right buttons in the indication selecting device 18).

The shape display data generation device 30 generates data for display for displaying the shape of the area obtained in the process of growth/reduction (or as a result thereof) with an outline having a certain color/line width or by filling the inside thereof with a predetermined translucent color. The image based on the generated data for display is superimposed on the input image to be displayed on the screen of the image display device 14.

Figure 3:
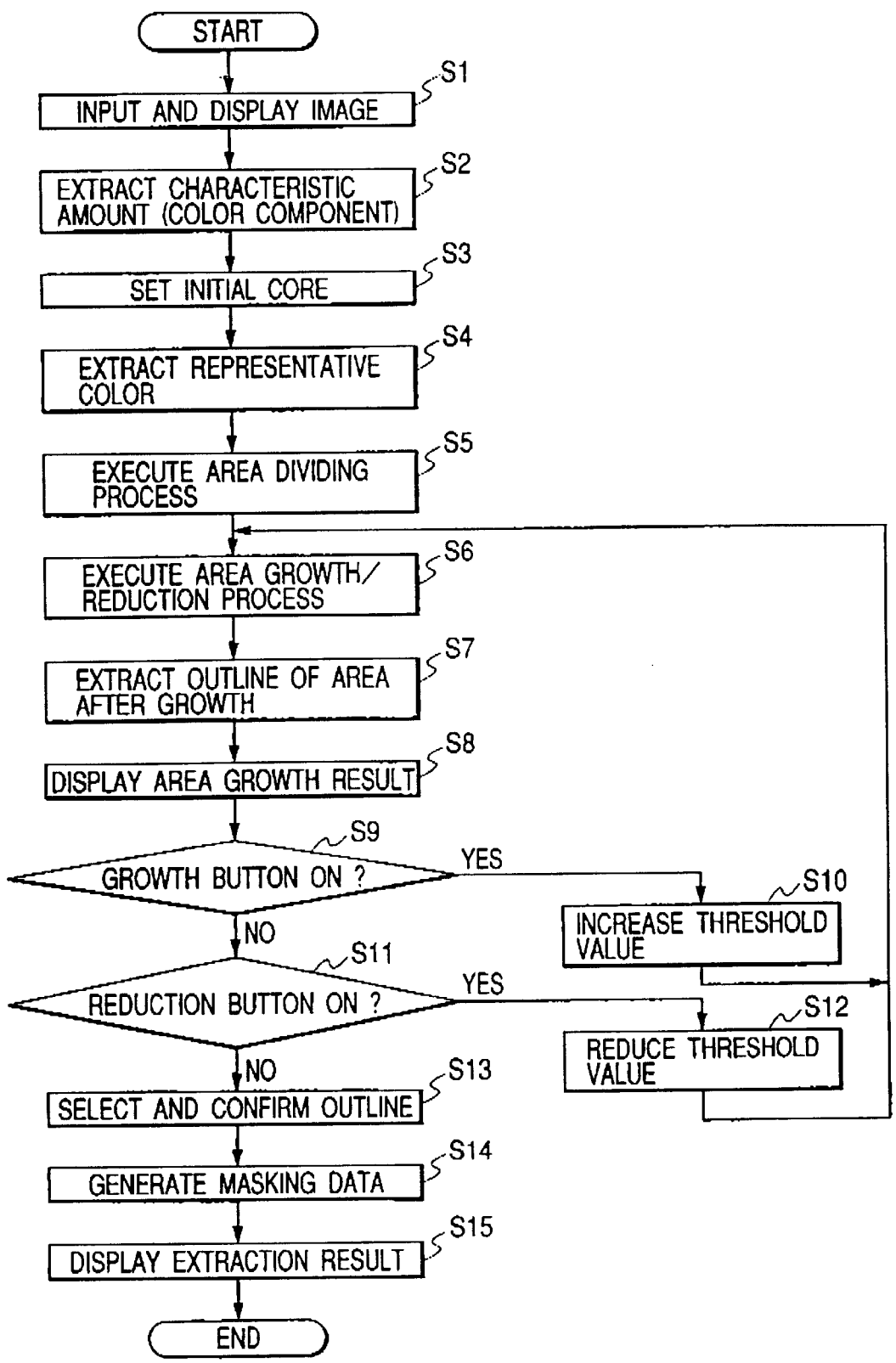
FIG. 3 is a flowchart of operation of a first example.
Figure 4:
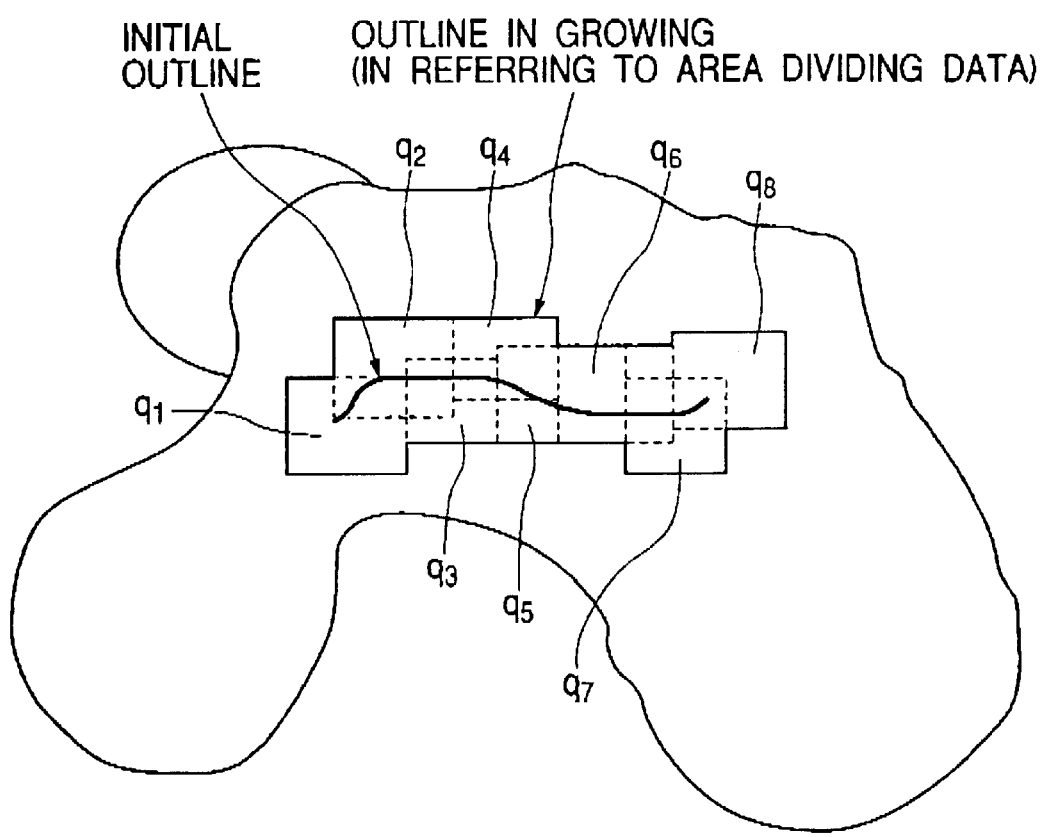
FIG. 4 is an example of an image in a processing process of the first example.
Figure 5:
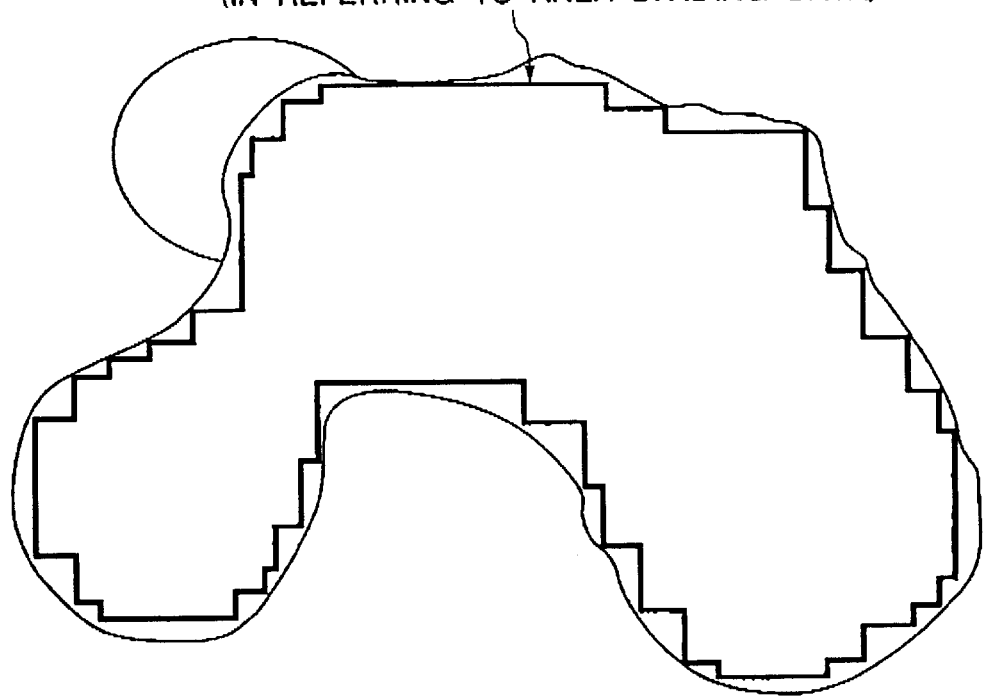
FIG. 5 is an example of an image in the processing process of the first example.
Figure 6:
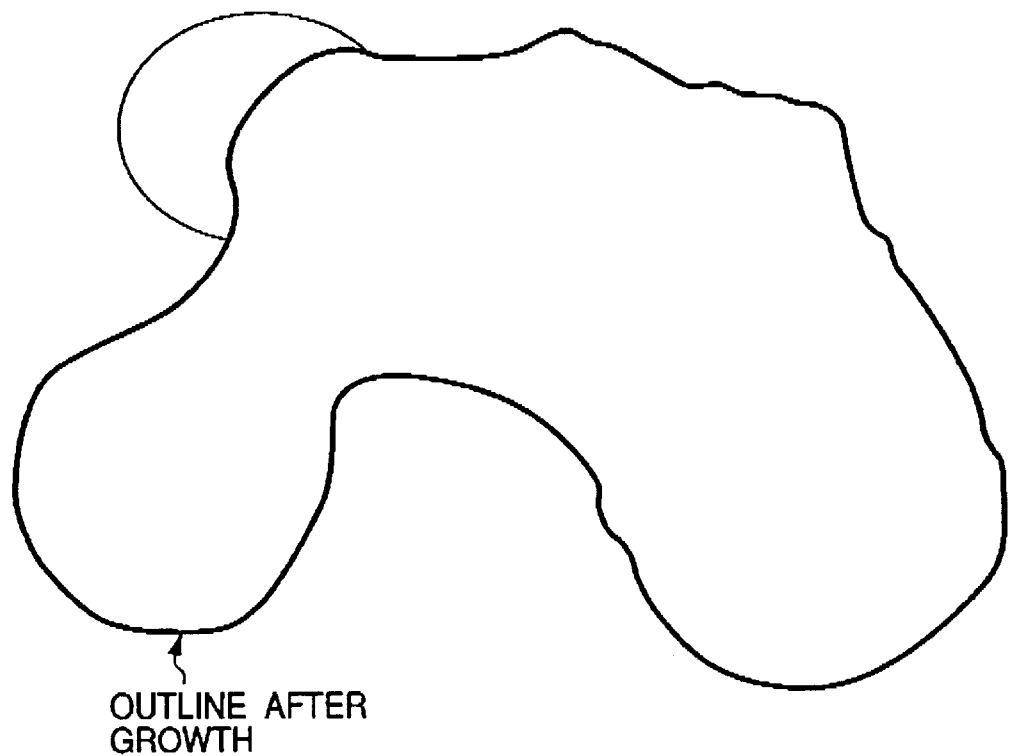
FIG. 6 is an example of an image in the processing process of the first example.

FIG. 3 shows an operation flowchart of this example. The operation of this example will be described referring to FIG. 3. Examples of the image in the processing process are shown in FIG. 4, FIG. 5 and FIG. 6.

First, when an image is inputted, it is displayed on the screen of the image display device 14 (S1). Next, chromaticity, contrast, edge strength and texture characteristic amount are extracted (S2). The user sets an initial core of any shape neighboring the subject in the image displayed on the screen of the image display device 14 which he or she wants to clip, using the indication selecting device 18 (mouse) (S3). For example, while confirming the position of a cursor (not shown) displayed on the screen of the image display device 14, the button on the indication selecting device 18 is pushed to delineate the path of the curve located neighboring the subject to be clipped. The initial core setting device 20 samples points on the path at a predetermined interval, and generates a smooth curve linking between sampling points, which is determined as the initial core (refer to FIG. 4). Also, in the case where the user clicks the button of the indication selecting device 18 at a position of any point outside the subject, initial core setting device 20 may generate an initial core by linking between clicked points with a straight line or by forming a rectangular outline from two points being opposite to each other.

The representative color extraction device 24 extracts a representative color from points on the initial core (if the initial core is a two dimensional area, points on the boundary of the area or points inside the area) (S4). As for an extraction method, the initial point to be sampled may be registered as a representative color, and the color component in which the difference (distance in the color space) between the registered representative color and the color component is larger than the standard value may be added to the list data of representative colors in succession.

The area dividing device 26 divides the entire image into areas based on the representative color list data (S5). That is, the input image is scanned for each pixel and the difference (distance in the color space) between the value of each pixel and the representative color is determined, and labeling value '1' is added to the pixel if the difference is the standard value or less, and labeling value '0' is added to the pixel if the difference is beyond the standard value. Assuming that the color component value of the attention pixel is (R, G, B)

and the color component value on the representative color list is $(R_i, G_i, B_i)$, the distance $D_i$ from an ith representative color is given by the following equation.

$$D_i = |R-R_i| + |G-G_i| + |B-B_i| \quad 5$$

where, i=1, ..., N, and N is the number of representative colors. Labeling value '1' is added if at least one distance $D_i$ is smaller than a predetermined threshold value (for example, intermediate value of 60 in case of having assigning intensity levels of 0 to 255) for the attention pixel, and labeling value '0' is added if differences from all representative colors are larger than the threshold value.

Furthermore, as another area dividing method, a method In which a two valued threshold value is estimated from so called density histogram without referring to representative colors (such as P tile method and determination analysis method) may also be used. Also, in this example, the area dividing process is executed using a relatively simplified method particularly in terms of high speed process, but it is needless to say that dividing data may be obtained by a process using clustering and stochastic and statistical processes.

When the above process is executed for all pixels, labeling is completed and the area dividing data is generated.

Figure 7:
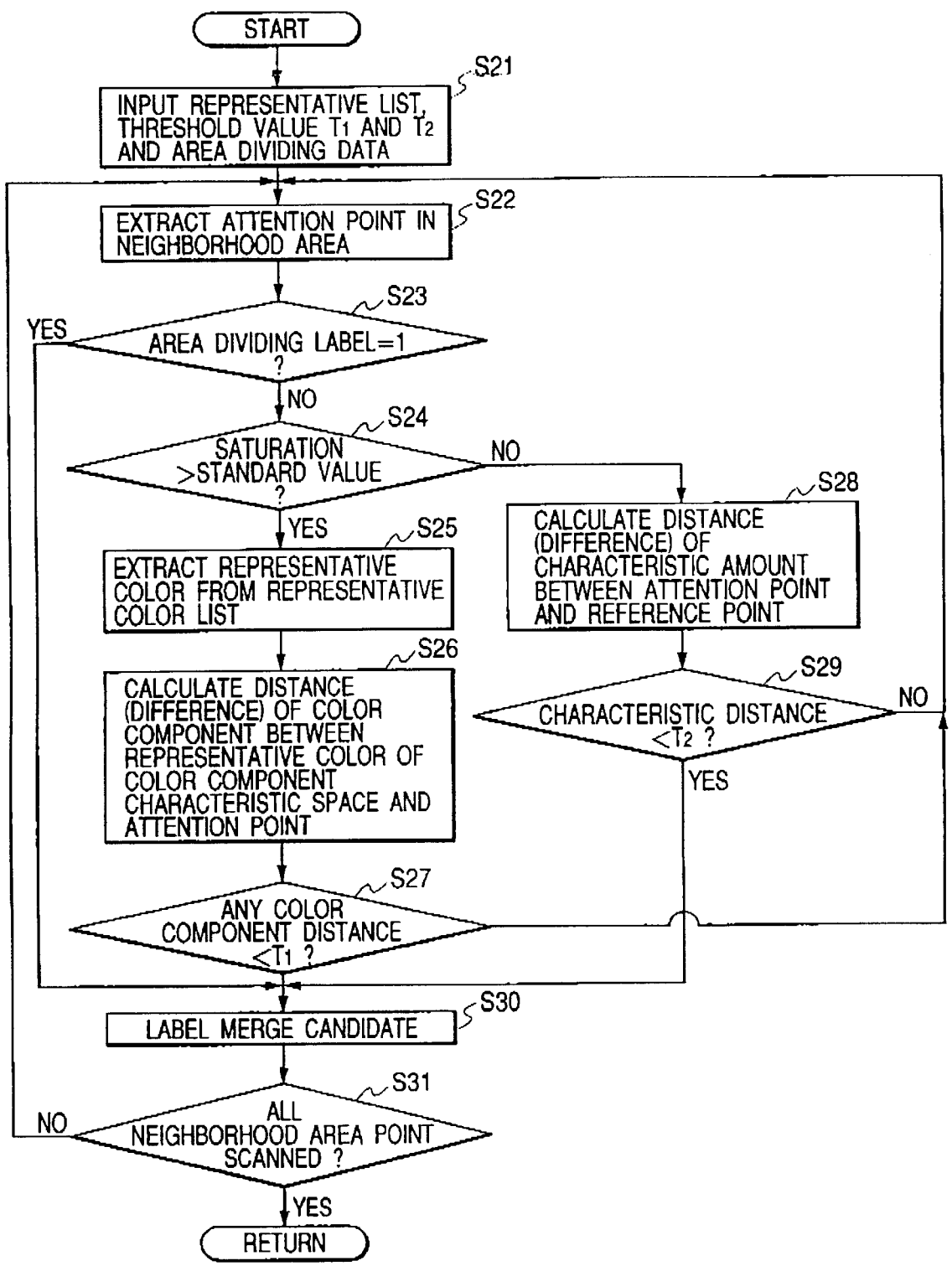
FIG. 7 is a detailed flowchart of an area growth/reduction process (S5)

The area growth/reduction device 28 samples representative points on the outline, and sets the area neighboring each representative point $(q_1, q_2, ..., q_n)$. In this example, the area neighboring each representative point includes rectangular areas of predetermined size (for example, both length and width represent 30 pixels), and is set so that one area touches another or one is superimposed on another in more than certain width). FIG. 7 shows a detailed flowchart of the area growth/reduction process (S5).

In the area growth/reduction process (S5), the threshold value for growth/reduction, the list of representative colors and area dividing data are inputted (S21). The inside of the neighborhood area is scanned, and each pixel is extracted as an attention point (S22). At each attention point, the labeling value of area dividing data is referred to (S23), and if it is '1' (S23), the pixel of such an attention point is registered as a candidate to be merged into the area without any condition (S30). That is, for the pixel, the value of the mask data for extraction area determination is determined as '1' ('1' represents an extraction area candidate).

If the area dividing data of the attention point is label 0 (S23), the saturation value of the attention point is compared with a predetermined standard value (S24), and if the saturation is higher than the predetermined standard value, the representative color is extracted from the list of representative colors for the chromaticity defined below as a characteristic amount (S25), and the difference between the representative color and the color component of the attention point (distance in the color space) is determined (S26). If the saturation of the attention point is low (S24), the difference between the representative point and the attention point is determined for the characteristic amount defined below as a characteristic amount (S28). The reason why chromaticity is not referred when the saturation is low is that change of lightness of the images is large in this case but is small for chromaticity and the confidence level as area dividing characteristic amount is reduced.

The chromaticity (r, g, b) used here is a color component characteristic amount defined as;

r=R/V
g=G/V
b=B/V
V=(R+G+B)/3

Using chromaticity is advantageous in that the process can be executed in a practically two dimensional characteristic space and high speed is ensured compared to the process in the color space of (R, G, B).

A variety of definitions can be considered for the contrast amount C, but in this example, $C=Q_{max}/Q_{min}$ is used. $Q_{max}$ represents a maximum value of lightness in the neighborhood area including the attention point, while $Q_{min}$ represents a minimum value of lightness in the neighborhood area. If the saturation of the attention point is higher than the standard value, difference $L_i$ between the chromaticity $(r_i, g_i, b_i)$ corresponding to each representative color created in advance and the chromaticity at the attention point (r, g, b) is given by the following equation. That is, $$L_i = |r - r_i | g - g_i + |r - r_i + g - g_i|$$

where i=1 to N. If $L_i$ equals the threshold of the area growth/reduction process with respect to the color component characteristic amount (chromaticity) $(T_1)$ or less, the attention point is determined as a candidate to be merged into the growth area (S30). Furthermore, the third item of the right side of the definition equation of $L_i$ is equivalent to $|b-b_i|$.

In the case where the saturation of the attention point is lower than the standard value (S24), assuming that the contrast value $C_0$ at the latest location (such as cursor position) designated by the indication selecting device 18 is a reference characteristic amount, a difference L between the contrast $C_0$ and the contrast C of the attention point is calculated from;

$$L = |C - C0|$$

And, if this value is a threshold value of the area growth/reduction process with respect to the contrast $(T_2)$ or less, the attention point is determined as a candidate to be merged into the growth area (S30).

Figure 8:
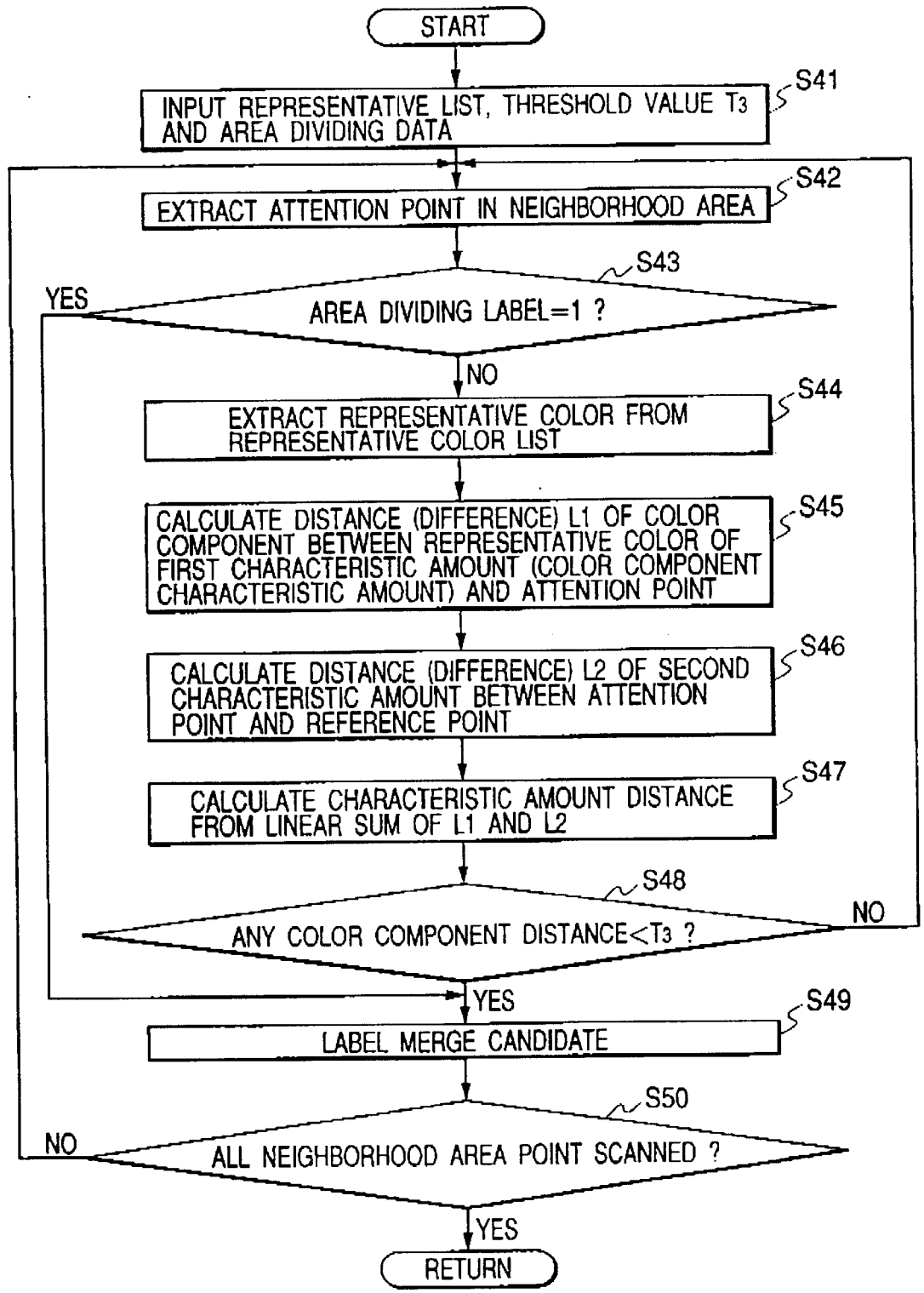
FIG. 8 is another flowchart of a characteristic amount reference method.

The method for referring to characteristic amount is not limited to the above example, and for example the method shown in FIG. 8 may be used. That is, the list of representative colors, the threshold for area growth/reduction process $(T_3)$ and area dividing data are inputted (S41), and each attention point is extracted (S42). The area dividing label of each attention point is referred to (S43), and if the labeling value is '1', then a merge candidate label is added to the attention point (S49). The process which has been described so far is identical to that shown in FIG. 7.

If the area dividing label is '0' (S43), the representative color being first characteristic amount is inputted from the list of representative colors (S44), a difference with respect to the color component (chromaticity) is calculated (S45) and a difference with respect to the contrast, edge strength or texture characteristic amount being second characteristic amount is calculated (S46) to collect linear sums of both as shown in the following equation. That is, $$F_i = \alpha \{|r-r_i| + |g-g_i| + |r-r_i + g-g_i|\} + \beta |C-C_0|$$

$F_i$ of this equation is determined for each representative color (S47), and if any $F_i$ is less than the threshold $(T_3)$ (S48), a merge candidate label is given to the attention point (S49). α and β may be constants or figures that vary depending on other characteristic amount of the attention point (a characteristic amount other than the first and second characteristic amount, for example edge strength when the second characteristic amount is contrast).

Figure 9:
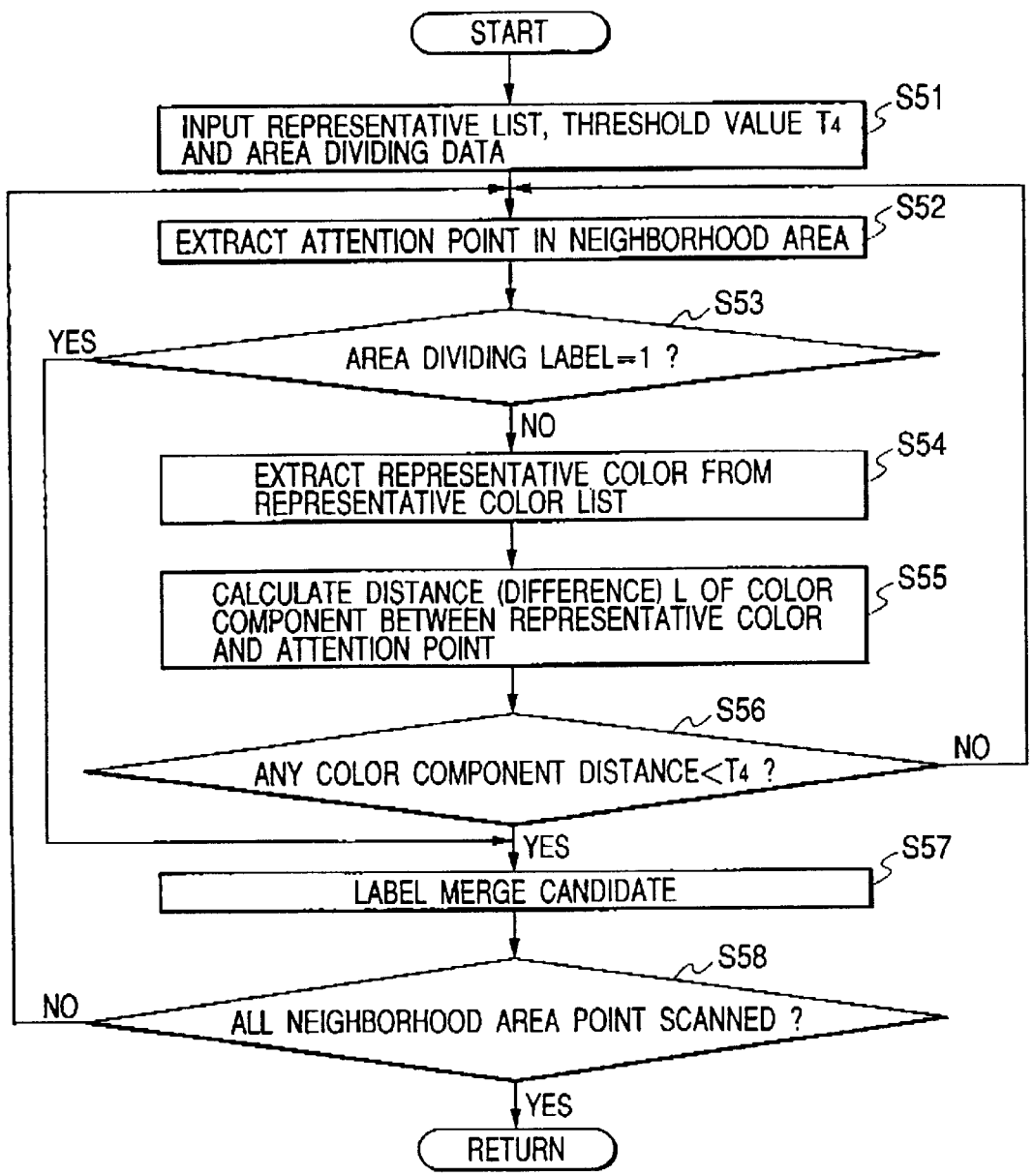
FIG. 9 is another flowchart of the area growth/reduction process (SS)

Furthermore, as a more simplified method, areas may be grown/reduced using a method as shown in the FIG. 9. That is, the list of representative colors, the threshold value for the area growth/reduction process ($T_4$) and area dividing data (S51) are inputted, and each attention point is extracted (S52). The area dividing label of each attention point is referred to (S53), and if the labeling value is '1' (S53), then a merge candidate label is added to the attention point (S57). The method so far is identical to that shown in FIG. 7.

If the area dividing label is '0' (S53), the representative color being first characteristic amount is inputted from the list of representative colors (S54), the distance (difference) Li with respect to the color component (R, G, B) is calculated from the following equation. That is, $$L_i = |R - R_i| + |G - G_i| + |B - B_i|$$

If any distance $L_i$ of calculated distances is less than the threshold $T_4$ (S56), a merge candidate label is added to its attention pixel (S57).

For measures that represent differences of characteristic amount, in addition to the sum of differential absolute values of each element used above, Euclidean distance and high dimensional Minkowski distance may be used.

Threshold values ($T_1$, $T_2$) used in the area growth [reduction] process are not fixed, but they increase with time (or each time the rotation number of the process step increases) during area growth (S9, S10) and decrease during area reduction (S11, S12). However, there may be a condition that they remain constant values at some point. That is, the threshold is in non-decrease during area growth, and is in non-increase during area reduction.

The initial value of threshold values ($T_1$, $T_2$) and the rate of change during their increasing and during their decreasing are set to be suitable values. Generally, they are determined as suitable values, particularly depending on execution environment such as operational clock frequencies and memory amounts and core sizes (input image size) of CPU of the image processing device 16. In this way, suitable parameter values for area growth are preferably automatically set. These parameters may be set in advance as fixed values or changed by the user.

The rate of change of thresholds ($T_1$, $T_2$) is not fixed, but may be changed non-linearly depending on conditions of the area growth/reduction process. For example, the absolute value of change rate of threshold values may be adapted to be large when the change rate of boundary length of the area is large, and by contrast, the change rate of threshold values may be adapted to be small when the change rate of the boundary length is small. The change rate of threshold values may be adapted to be large when the change rate of the edge proportion on the outline of the area in the growth process is large, and the change rate of threshold values may be adapted to be small when the change rate of the edge proportion is small. By doing this, the course of area growth/reduction process can be fast processed and, in addition, fine adjustment is possible for accurately extracting the outline of the extraction subject.

As another method for changing the change rate of threshold values, adaptation may be made so that the absolute value of the change rate of threshold values is enlarged in a predetermined magnification only while the user pushes a specific key on the keyboard of the computer, etc.

In this example, the user can provide indications as to whether the area is grown or reduced by a certain operation. For example, setting may be made such that growth or reduction is determined by pushing which of left and right buttons of the indication selecting device (mouse) 18.

The area growth/reduction device 28 determines among candidate pixels to be merged into the area a pixel that includes an initial core to form one connection area as a determined area by area growth/reduction. Here, for ensuring high speed, it is assumed that two valued map data for reference is generated in advance to distinguish between candidate pixels and non-candidate pixels for merger as follows.

The location of the boundary of the continuous area composed of merge candidate points is retrieved in horizontal direction starting from the representative point of an initial core, and the boundary is tracked starting from the boundary point initially detected. Since this tracking process is performed on two valued data, it can be executed with a simple algorithm (Ankyoin, Nagao, "Recognition and Processing of Images", p72–p73, 1992, Shokodo). When a closing curve is detected by the tracking, whether or not the representative point is included inside the closing curve is determined. If the representative point is included inside the closing curve, the area surrounded by the closing curve is a determined area. If the representative point is not included inside the closing curve, other boundary point (tracking starting point) is similarly retrieved in horizontal direction, and after that, the same processing is repeated until the closing curve including the representative point is detected.

In area growth/reduction process, edge strength or the texture characteristic amount may be used instead of the contrast characteristic amount. The edge strength is typically extracted by filter process with space differential operations such as Sobel, Prewitt, and Camy.

The texture characteristic amount includes, for example, characteristic vectors having Gabor wavelet conversion coefficients as elements obtained from the convolution operation of predetermined directional components different from each other, Gabor filter kernels having scaling factors and light and dark distribution of input images (equivalent to so called lightness distribution), or characteristic vectors having the average value of each Gabor wavelet conversion coefficient and dispersion values as elements (B. S. Manjunath and W. Y. Ma, "Texture Features for Browsing and Retrieval of Image Data", IEEE Transactions on Pattern Analysis and Machine Intelligence, vol. 18, pp. 837–842, 1996). For the kernel for Gabor wavelet conversion, one that has six directions at 30° intervals (0°, 30°, . . . , 150°) and scaling levels of three stages (1, ½ and ¼) was used.

The shape display data generation device 30 displays the outline after area growth/reduction superimposed on the original image on the screen of the image display device 14 (S8). Thus, the user, while watching this, stops the operation of area growth/reduction at some appropriate point, or can convert the operational mode from growth to reduction (or vice versa), thereby determining the area shape after performing fine adjustment of the shape change of the outline.

By user's operation (mouse operation) using the indication selecting device 18, the segment of the outline that is in fact converged into the extraction subject properly may be selected. in this case, that part (or entire outline) is determined as the outline of the extraction subject (S13). The part of the outline to be extracted, which has not been selected here, can be obtained by applying the aforesaid process to the area growth/reduction from other initial core, or using other methods (for example, outline tracking method).

Finally, the extraction area determination device 32 generates mask data representing the outline extracted by the method as described above and the area inside the closing curve of the extraction subject (generally two value data, setting '1' for each pixel inside the mask area, and '0' for each pixel outside the mask era) (S14). By calculating logical products of this mask and the original image, intended subject images are extracted. The result of extraction is displayed so that the result can easily be viewed on the screen of the image display device 14 (S15). For example, the area other than extraction subjects is colored with a specific color, and the extracted outline is flashed.

The update characteristics for use in area growth may be a function that is in non-decrease (in case of growth) or non-increase (in case of reduction) for the edge proportion on the outline or the number of convergence determinations.

Each process described above is recorded in a predetermined recording medium as a whole and can be executed by a predetermined program that can be run with a computer, but also part or all of processes can be implemented with a predetermined gate array (FPGA, ASIC). of course, they may also be implemented in forms in which hardware and software are mixed. Each element of the present invention is not necessarily same as the configuration shown in FIG. 1, and elements that are substantially same in function or the case where one element comprises functions of plurality of elements shown in FIG. 1 are also included in the present invention. Alteration and modification like this are of course applicable in the following examples.

Second Example

The representative color extraction device 24 and area growth/reduction device 28 may be modified as follows. That is, the representative color extraction device 24 resamples representative points on the outline of the area in the area growth/reduction process, and extracts reference characteristic amount (such as the list of representative colors) for each neighborhood area of each representative point using the aforesaid method. Area growth/reduction device 28 grows and reduces the area using reference characteristic amount extracted for each neighborhood area. In this case, the variation of threshold values ($T_1$, $T_2$) Is determined for each neighborhood area.

Figure 10:
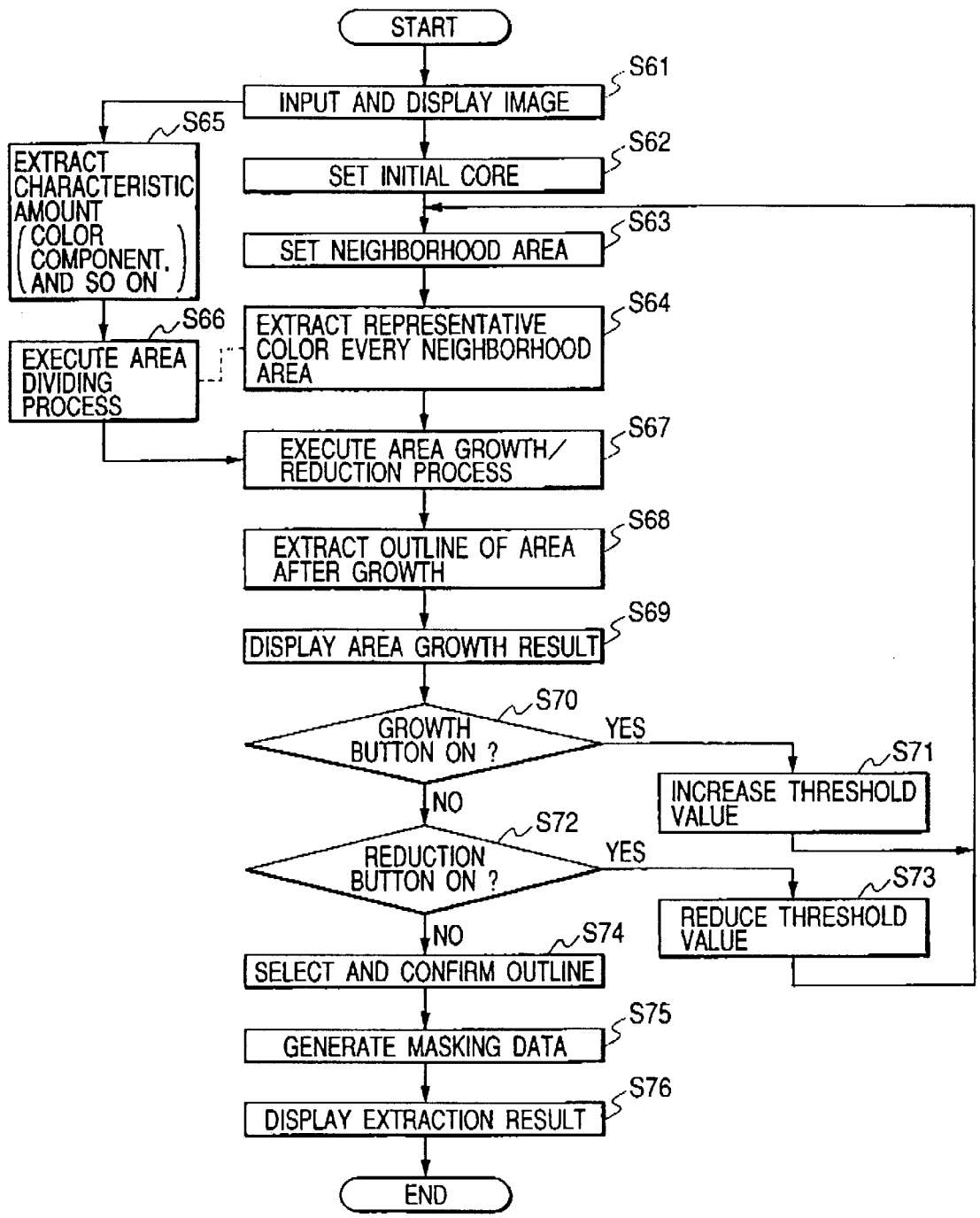
FIG. 10 is a flowchart of a second example of the present invention.

General operation will be described referring to FIG. 10. The image is inputted and displayed (S61), after which the user sets the initial core by the indication selecting device 18 (S62). The area neighboring a point on the initial core is automatically set in a predetermined size (S63), and a representative color is extracted for each neighborhood area as previously described (S64). On the other hand, when the image is inputted, characteristic amount (such as color component, edge strength and contrast characteristic amount) for use in the area growth/reduction process are extracted for each pixel (S65) and the area is divided (S66) in advance. The area dividing process (S66) may be performed for the peripheral area of the neighborhood area using the representative color extracted in each neighborhood area (in the case where the representative color extracting step (S65) shown in FIG. 10 is linked with the area dividing step (S66) by a dashed line), or area dividing may be performed for the entire image by other methods.

Following the area growth/reduction process (S67), the variation of the threshold value is set for each neighborhood area (S71, S73), and the outline of the area after growth is resampled and the neighborhood area is reset for each sampling point (S63). The area growth/reduction process is executed for each reset neighborhood area (S67). Operations other than these steps are identical to those of FIG. 3.

Figure 11:
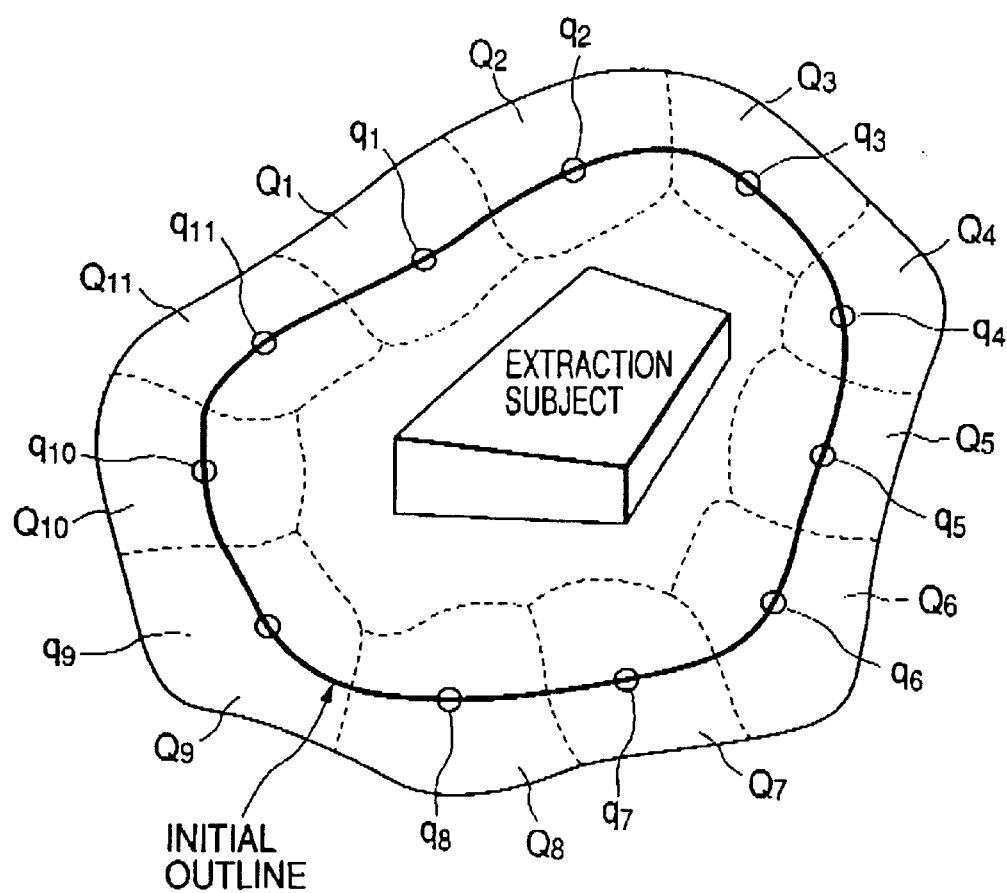
FIG. 11 is an example of display in the area growth process in the second example.
Figure 12:
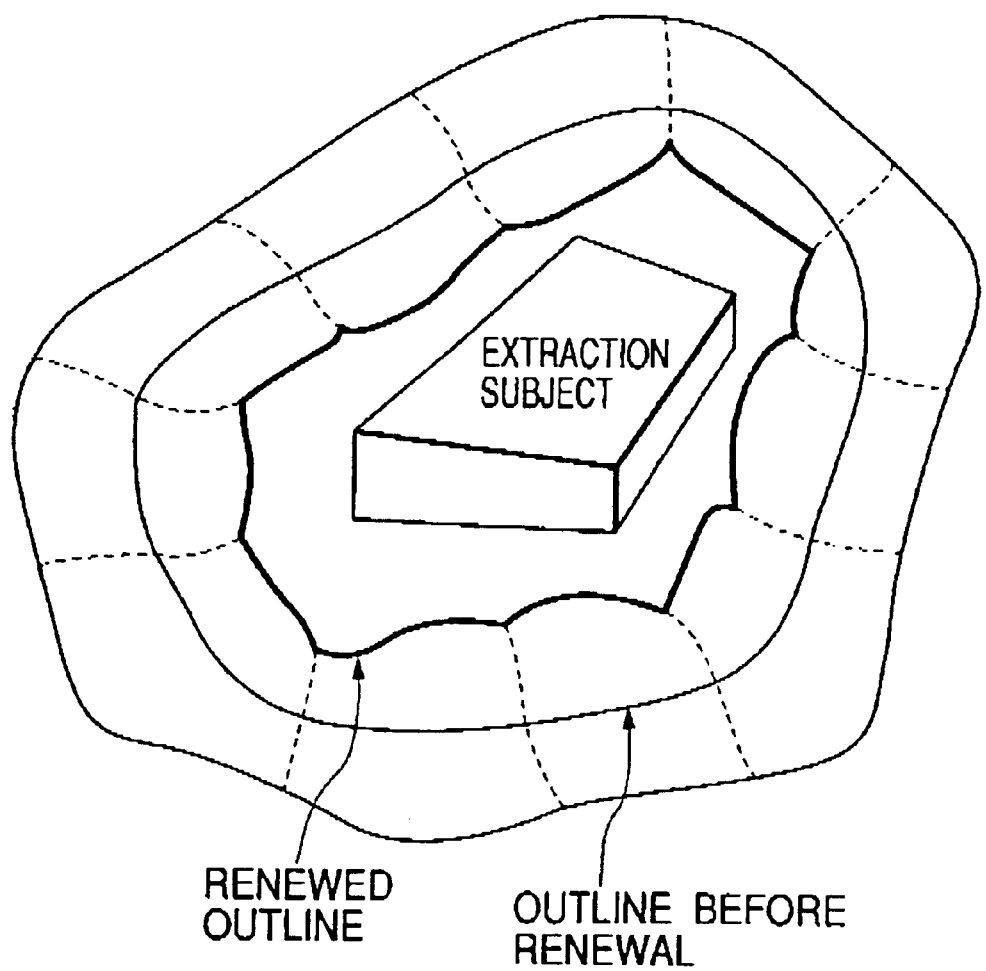
FIG. 12 is an example of the outline after upgrading in the second example.

FIG. 11 shows neighborhood areas for each representative point obtained as a result of area growth ($q_1, q_2, \ldots, q_n$) and areas after growth ($Q_1, Q_2, \ldots, Q_n$) in such a way that they do not overlap one another for convenience. A boundary between each area after growth is illustrated using dashed lines. In this example, although overlapping between areas occurs, there is no problem in terms of execution since one connection area is selected as the summation of areas after growth process. FIG. 12 shows an outline after updating.

Figure 13:
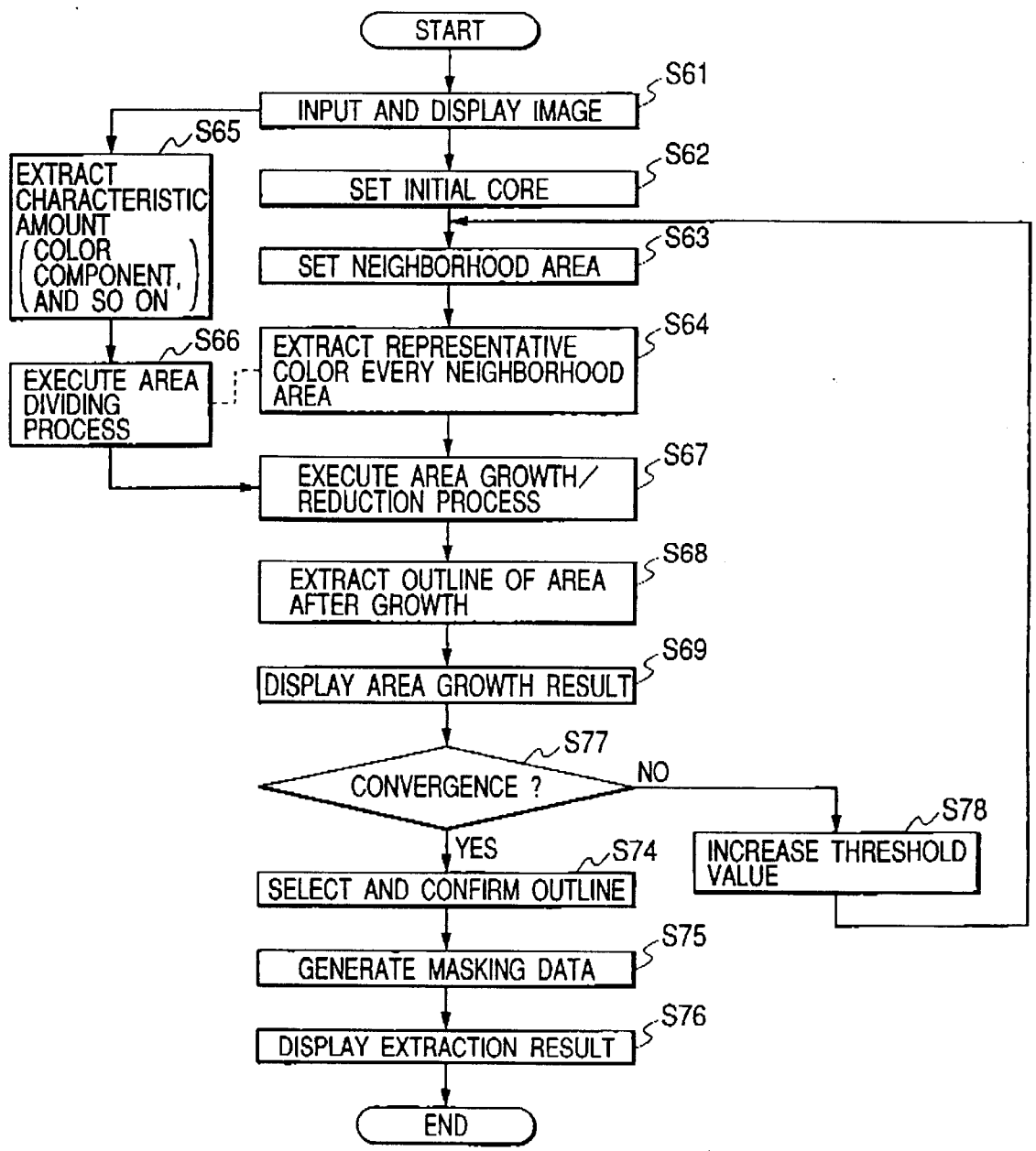
FIG. 13 is a flowchart of process adapted for automatically determining the convergence of the area growth/reduction process.
Figure 14:
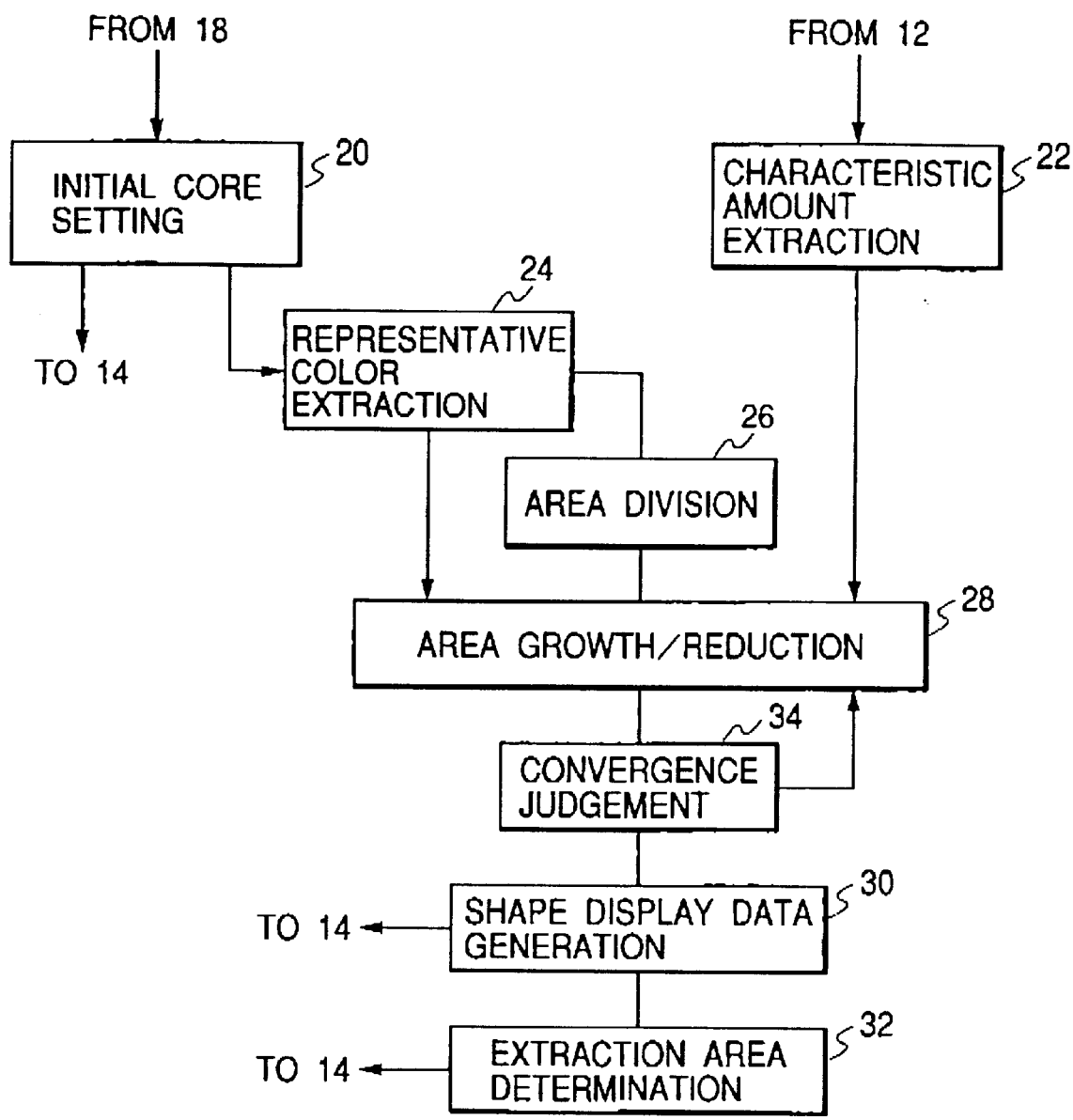
FIG. 14 is a schematic block diagram of the image processing device 16 to which the function to automatically determine the convergence of the area growth/reduction process is added.

FIG. 13 shows a process flowchart in which the convergence in the area growth/reduction process is automatically determined. A schematic block diagram of the image processing device 16 to which a function for automatically determining the convergence in the area growth/reduction process is added is shown in FIG. 14. A convergence determination device 34 is located between the area growth/reduction device 28 and the shape display data generation device 30. Elements other than the convergence determination device 34 are same as those in FIG. 2. On-off of the growth/reduction button of the flowchart shown in FIG. 10 and the process of increasing and decreasing threshold values in accordance with it (S70 to S73) were automatically determined for convergence (S77), and in the case where convergence did not happen, the above process was replaced with the process of increasing threshold values (S78). Steps other than this are identical to the process flowchart shown in FIG. 10.

If the outline of the area in the growth process is in sufficient distance of the real outline of the extraction subject, the variation of threshold values may be set as follows. That is, the variation of threshold values is set to be large when the contrast value is low at the representative point, and the variation of threshold values is set to be small when the contrast is high. By contrast, in the case where the outline of the area exists neighboring the real outline, namely in the case where the real outline exists in the area neighboring the representative point, the variation of threshold values is set to be small at all times. If the sampling point passing through the area neighboring the point on the real outline and a spline curve that smoothly links between them are set in advance, whether the outline of the area exists neighboring the real outline or not can easily be determined.

In this manner, even when the outline of the extraction subject is of low contrast in order to have lightness and/or chromaticity with same degree as the background, an accurate outline shape can be extracted. As described above, by area growth/reduction process based on the setting of the threshold variation for each neighborhood area, the subject can be extracted as described above whether the input image is a static image or a dynamic image.

Third Example

Next, operations will be described when the input image is a dynamic image. In this case, the image input device 10 is configured by for example a video camera or a video reproduction device.

Figure 15:
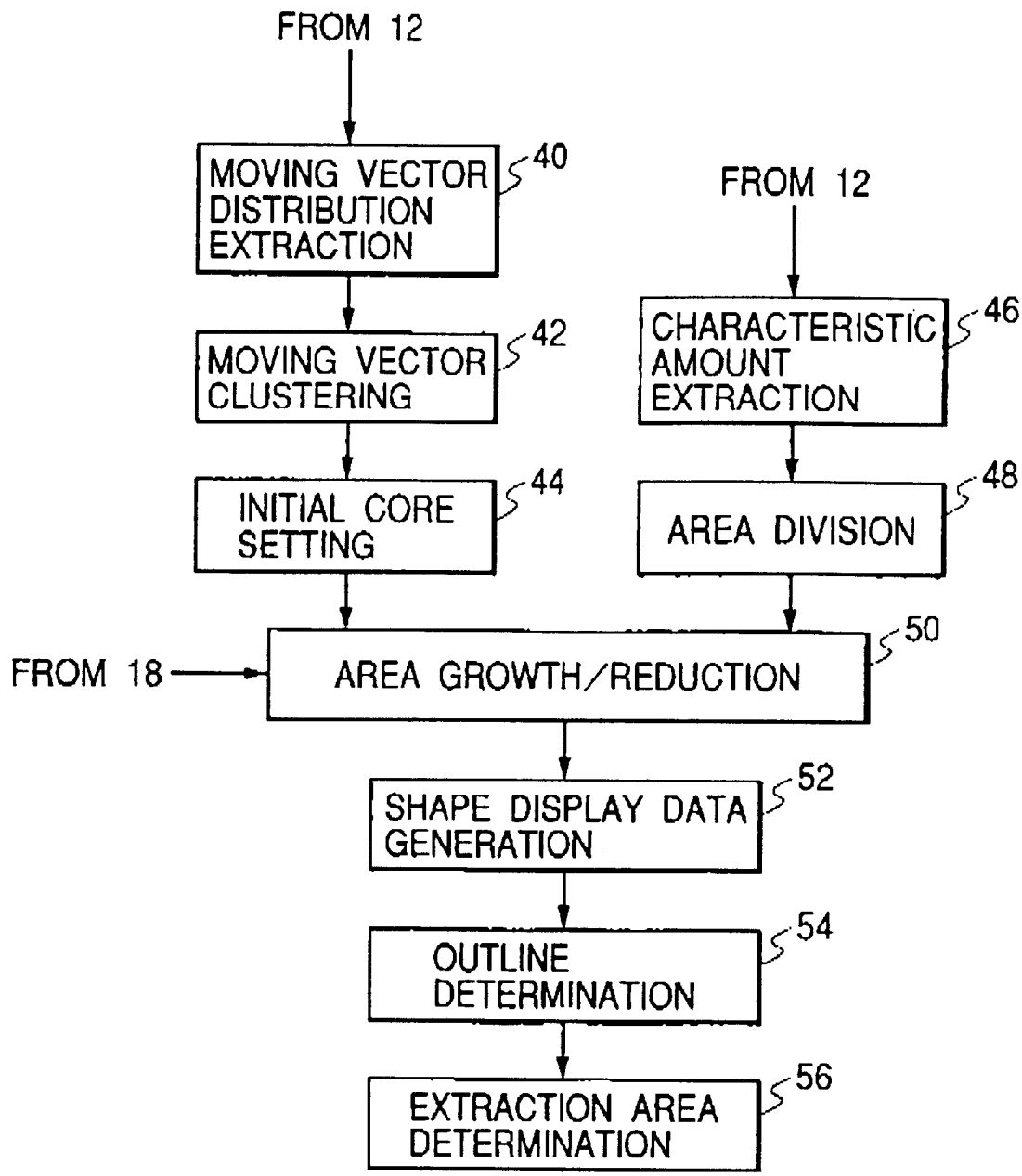
FIG. 15 is a schematic block diagram of the image processing device 16 compatible with dynamic images.

FIG. 15 shows a schematic block diagram of the image processing device 16 corresponding to a dynamic image. 40 is a motion vector distribution extraction device, 42 is a motion vector clustering device, 44 is an initial core setting device, 46 is a characteristic amount extraction device, 48 is an area dividing device, 50 is an area growth/reduction device, 52 is a shape display data generation device, 54 is an outline determination device, and 56 is an extraction area determination device. In addition, a primary storage device not shown in the figure is comprised.

Operations similar to those of the example initially described are performed on the initial screen, and the area of the extraction subject is extracted accurately. Then, a motional subject image is extracted from following time series image data. The area dividing device 48 generates area dividing data using the output of the motion vector clustering device 42 and the representative color obtained from the characteristic amount extraction device 46.

The initial core may be automatically set as a boundary of a polygon including (or included in) a connection area that is obtained from the clustering result of the motion vector. In case of being set to include the connection area, the initial core is considered to exist in the background excluding the extraction subject. This polygon may be a polygon circumscribing (or inscribing) the connection area, a polygon in which the distance between each point on the boundary thereof and the boundary of the connection area is not less than a certain value, or an outline of the connection area, etc. In the case where the initial core is automatically set, the initial core may be set using only image data of first and second frames, or may be set using two frame images neighboring each other in constant frame intervals.

The motion vector distribution extraction device 40 extracts the inputted time series image using the slope method (B. K. P. Horn and B. G. Schunck, "Determining optical flow", Artificial Intelligence, vol. 17, pp. 185–203, 1981), or extracts the distribution of the motion vector using a method in which each frame is divided into blocks and the corresponding point between frames is extracted by block matching, and the like.

The motion vector clustering device 42, using the k-NN identification method (Yachida, "Robot Vision", pp. 111, 1990, Shokodo) and the like, processes motion vector distribution data from the motion vector distribution extraction device 40, performs clustering of a grouping of motion vectors, labels and outputs the corresponding connection area.

The area dividing device 48 refers to the labeling data (motion vector dividing data) obtained from the clustering of the motion vector and the area dividing data based on the representative color obtained by the methods previously described, and generates dividing data so that the area including the extraction subject having a predetermined motion forms one connection area. Specifically, processes are performed as described below.

In the case where only one extraction subject with motion exists in the image, since the motion vector dividing data is divided into the static background and the moving subject, the area shape of the extraction subject can be determined accurately for the most part by performing logical operation of motion vector dividing data and area dividing data based on the representative color.

When area dividing is performed using only motion vectors, generally area loss may be caused. For example, the corresponding point is not properly extracted in an area where light and dark values are even, an area that has periodic pattern structures, and an area where a screened outline is produced in corresponding with the background portion, thus causing area loss easily. When area dividing is performed using only representative colors, particularly in the case where the pixel with its color component similar to the extraction subject and to the background exist together, loss of the area to be extracted and adherence and persistence of unnecessary areas may be caused.

Then, for partial connected areas including the portion where the area extracted by the motion vector and the area extracted based on the representative color overlap one another, the logical sum of both areas is adopted, and for other places (place where overlapping does not occur), the logical product is adopted. That is, the pixels forming connected areas with portions where overlapping occurs are determined as pixels belonging to extraction areas, and other pixels are excluded.

The area dividing data based on representative colors is two valued map, but this two valued data should be inverted, when the labeling value at the location corresponding to the extraction subject is '0' and the value at the location corresponding to the background is '1'. In this case, the user specifies in advance the representative color of the subject or the representative color of the background when performing area dividing based on the representative color, whereby inversion process is automatically started.

Operations in the characteristic amount extraction device 46, the area growth/reduction device 50 and the characteristic amount device 46 are identical to the operations of the image processing device 16 shown in FIG. 2, the frame image for which an initial core is set (or frame image on the outline after updating). The shape display data generation device 52 operates in the same way as the shape display data generation device 30.

Figure 16:
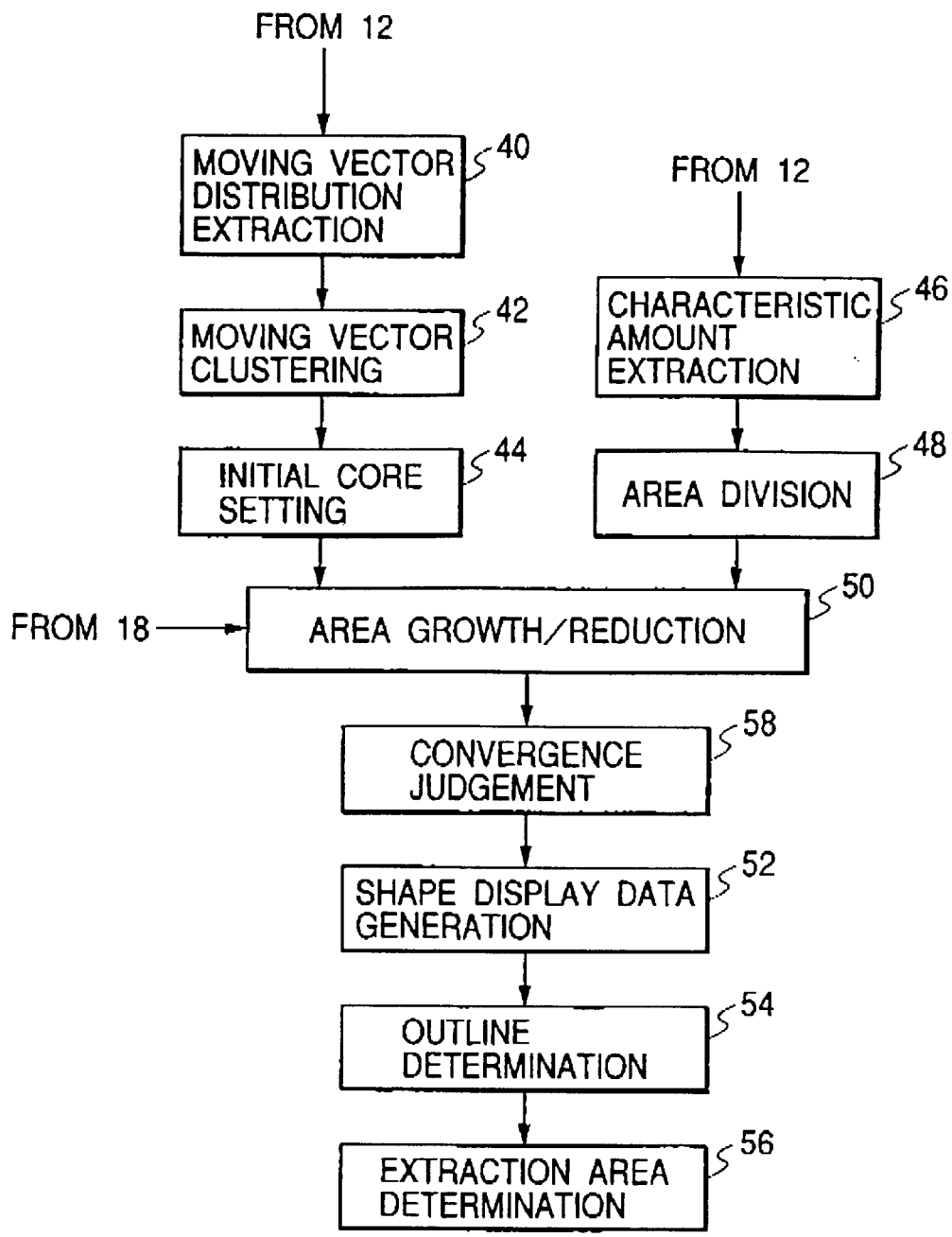
FIG. 16 is a schematic block diagram of the image processing device 16 adapted for automatically determining the convergence of the outline by the area growth/reduction process.

FIG. 16 shows a schematic block diagram of a configuration obtained by modifying the configuration shown in FIG. 15 so that the convergence of the outline by area growth/reduction is automatically determined. The convergence determination device 58 automatically determines the convergence from the result from the area growth/reduction device 50, and causes the area growth/reduction device 50 to execute the area growth/reduction process if the convergence is not implemented.

Fourth Example

The fourth example of the present invention will be described. The area dividing process may be performed according to known methods and each extracted area may be labeled in advance before the initial core is set. That is, a labeling value of the number of area (generally two or more) after dividing exists. In the area growth/reduction process, the labeling value '1' is added as the candidate pixel to be merged into the growth area uniformly to points in the same label area including representative point locations sampled when the initial core is set. To other pixels, the merge candidate labeling value '0' is added.

Processes in the fourth example will be described referring to FIG. 17. First, when an image is inputted, the image is displayed (S81), and the characteristic amount required for following processes (area dividing process an area growth/reduction process) is extracted (S82).

An area is divided according to known methods (for example, two valued, clustering, texturing and texture analysis, etc.), and an area dividing label Is added to each pixel (S83). Then, the initial core is set according to the method described with respect to the first example and the like (S84). At this time, the coordinate of the representative point is sampled, and is stored in the primary storage device for extracting the representative point from the pixel value on the representative point (S85). This representative color is stored as a representative color list in the primary storage device since there are generally a plurality of representative points.

Following processes are identical to those in the first example. That is, area growth/reduction process (S86), outline extraction (S87) and display of the area shape (S88)

follow, and the operation mode (area growth, reduction or stop) is updated (S89). Updating of the operation mode may be either Interface type updating by user's designation or automatic updating by convergence determination, etc. as in previous examples.

The threshold value is updated after updating of the operation mode (S90). That is, the threshold value is increased (non decrease) in the area growth mode, and the threshold value is decreased (non increase) in the area reduction mode. In the stop mode, user's confirmation of the outline of the extraction area and partial or whole selection of the outline are performed (S91) If the selected outline forms closing curve, mask data is generated (S92), and the result of extraction is displayed (S93). If the outline is not closing, operation returns to the initial core process (S84), and new initial core setting and following processes are repeated.

FIG. 18 shows a detailed flowchart of the area growth/reduction process (S86). The representative characteristic amount (such as color component) list, the threshold value for area growth/reduction process (T), area dividing label data and the representative point coordinate list are inputted (S101). The merge candidate labeling value '1' is added to each point in the same label area including the representative point (S102).

Each attention point is extracted in the neighborhood area (S103), the merge candidate labeling value of the point is referred to (S104), and if the labeling value is '1' (S104), whether or not all points in the neighborhood area have been scanned is determined (S109). If the labeling value is '0', the representative characteristic amount is read from the primary storage device (S105), and a difference (distance) L between the representative characteristic amount and the characteristic amount at the attention point is calculated as in the previous examples (S106). Since there are generally a plurality of representative amount, if any of characteristic amount differences is less than the threshold value (S107), the merge candidate labeling value '1' is added to the attention point (S108). And, above processes are repeated until the label addition is completed for all points in the neighborhood area.

As is easily understood from the above explanation, according to the present invention, the threshold value can be updated, the outline shape of a subject of any shape can be extracted and the image of the area therein can be clipped only by giving a rough indication (setting of the initial core) with respect to the extraction subject or non extraction subject (background), and giving an indication of area growth/reduction. Furthermore, in area growth with each representative point in the center, since the standard value of the characteristic amount (such as color component) is defined for each representative point, the boundary of the area which one wants to isolate can be extracted with fidelity and the image of the extraction subject area can be clipped even when many color components, etc. are distributed in the background or the extraction subject.

Furthermore, in according to the present invention, since information about rough shape of the subject (extraction subject) is automatically obtained based on the motion vector and an neighborhood outline (initial outline) with respect to the subject is set, only a moving subject can be extracted accurately and automatically from the dynamic image.

What is claimed is:

1. An image processing method, comprising:
an inputting step of inputting an image;
an area dividing step of dividing the image into a plurality of areas based on a predetermined characteristic amount to generate dividing data;
a representative position designating step of designating a representative position composed of at least one point on the image;
a shape changing step of changing a shape of a predetermined continuous area including the representative position by referring to the dividing data;
a displaying step of displaying the continuous area whose shape is changed; and
an extraction area determining step of determining the continuous area after the change in said shape changing step as an extraction area,
wherein the shape changing step refers to the dividing data and a predetermined image characteristic amount, and
wherein the predetermined image characteristic amount that is referred to at a predetermined point of the image in the shape changing step is a color component characteristic amount, if saturation is equal to or greater than a predetermined threshold value at the point, and is one of a contrast characteristic amount, an edge strength characteristic amount and a lightness characteristic amount, if saturation is less than the threshold value at the point.

2. The image processing method according to claim 1, wherein the image characteristic amount is color component characteristic amount at each point of the image.

3. The image processing method according to claim 2 wherein the color component characteristic amount is chromaticity.

4. The image processing method according to claim 1, wherein the image characteristic amount is contrast characteristic amount at each point of the image.

5. The image processing method according to claim 1, wherein the image characteristic amount is edge strength amount at each point of the image.

6. The image processing method according to claim 1, wherein the image characteristic amount is texture characteristic amount at each point of the image.

7. The image processing method according to claim 1, wherein the image characteristic amount is motion vector characteristic amount at each point of the image.

8. The image processing method according to claim 7, wherein the color component characteristic amount is chromaticity.

9. The image processing method according to claim 1, wherein the color component characteristic amount is chromaticity.

10. A storage medium that stores a program of an image processing method, wherein the image processing method comprises;
an inputting step of inputting an image;
an area dividing step of dividing the image into a plurality of areas based on a predetermined characteristic amount to generate dividing data;
a representative position designating step of designating a representative position composed of at least one point on the image;
a shape changing step of changing a shape of a predetermined continuous area including the representative position by referring to the dividing data;
a displaying step of displaying the continuous area whose shape is changed; and an extraction area setting step of setting the continuous area after the change in said changing step as an extraction area, wherein the shape changing step refers to the dividing data and a predetermined image characteristic amount, and wherein the predetermined image characteristic amount that is referred to at a predetermined point of the image in the shape changing step is a color component characteristic amount, if saturation is greater than or equal to a predetermined threshold value at the point, and is one of a contrast characteristic amount, an edge strength characteristic amount and a lightness characteristic amount, if saturation is less than the threshold value at the point.

11. An image processing apparatus, comprising:

inputting means for inputting an image;

area dividing means for dividing the image input by the inputting means into a plurality of areas based on a predetermined characteristic amount to generate dividing data, representative position designating means for designating a representative position composed of at least one point on the image;

shape changing means for changing a shape of a predetermined continuous area including the representative position by referring to the dividing data;

displaying means for displaying the continuous area whose shape is changed; and extraction area determining means for determining the continuous area after the change by said shape changing means as an extraction area, wherein the shape changing means refers to the dividing data and a predetermined image characteristic amount, and wherein the predetermined image characteristic amount that is referred to at a predetermined point of the image by the shape changing means is a color component characteristic amount, if saturation is greater than or equal to a predetermined threshold value at the point, and is one of a contrast characteristic amount, an edge strength characteristic amount and a lightness characteristic amount, if saturation is less than the threshold value at the point.

12. An image processing method, comprising:

an inputting step of inputting an image;

an area dividing step of dividing the image into a plurality of areas based on a predetermined characteristic amount to generate dividing data;

a representative position designating step of designating a representative position composed of at least one point on the image;

a shape changing step of changing a shape of a predetermined continuous area including the representative position by referring to the dividing data;

a displaying step of displaying the continuous area whose shape is changed; and an extraction area determining step of determining the continuous area after the change in said shape changing step as an extraction area, wherein the shape changing step refers to the dividing data and a predetermined image characteristic amount, and wherein the predetermined image characteristic amount that is referred to at a predetermined point of the image in the shape changing step is a weighted addition amount of a first characteristic amount being a color component at the point and a second characteristic amount being one of a contrast component, an edge strength component and a lightness component.

13. The image processing method according to claim 12, wherein the color component characteristic amount is chromaticity.

14. A storage medium that stores a program of an image processing method, wherein the image processing method comprises;

an inputting step of inputting an image;

an area dividing step of dividing the image into a plurality of areas based on a predetermined characteristic amount to generate dividing data;

a representative position designating step of designating a representative position composed of at least one point on the image;

a shape changing step of changing a shape of a predetermined continuous area including the representative position by referring to the dividing data;

a displaying step of displaying the continuous area whose shape is changed; and an extraction area setting step of setting the continuous area after the change in said shape changing step as an extraction area, wherein the shape changing step refers to the dividing data and a predetermined image characteristic amount, and wherein the predetermined image characteristic amount that is referred to at a predetermined point of the image in the shape changing step is a weighted addition amount of a first characteristic amount being a color component at the point and a second characteristic amount being one of a contrast component, an edge strength component and a lightness component.

15. An image processing apparatus, comprising:

inputting means for inputting an image;

area dividing means for dividing the image input by the inputting means into a plurality of areas based on a predetermined characteristic amount to generate dividing data, representative position designating means for designating a representative position composed of at least one point on the image;

shape changing means for changing a shape of a predetermined continuous area including the representative position by referring to the dividing data;

displaying means for displaying the continuous area whose shape is changed; and extraction area determining means for determining the continuous area after the change by said shape changing means as an extraction area, wherein the shape changing means refers to the dividing data and a predetermined image characteristic amount, and wherein the predetermined image characteristic amount that is referred to at a predetermined point of the image by the shape changing means is a weighted addition amount of a first characteristic amount being a color component at the point and a second characteristic amount being one of a contrast component, an edge strength component and a lightness component.

16. An image processing method comprising
an inputting step of inputting an image;
an area dividing step of dividing the image into a plurality of areas based on a predetermined characteristic amount to generate dividing data;
a representative position designating step of designating a representative position composed of at least one point on the image;
a shape changing step of changing a shape of a predetermined continuous area including the representative position by referring to the dividing data;
a displaying step of displaying the continuous area whose shape is changed; and
an extraction area determining step of determining the continuous area after the change in said shape changing step as an extraction area,
wherein the area dividing step comprises:
a representative color component characteristic amount extracting step of extracting at least one representative color component characteristic amount at a representative position composed of at least one point of the image; and
a labeling step of adding a first labeling value in the case where at least one of plural color space distances respectively defined between the color component characteristic amount at each point of the image and each representative color component characteristic amount is a predetermined threshold value or less, and adding a second labeling value in the case where the distance is more than the threshold value, and generating the label data as the dividing data.

17. A storage medium that stores a program of an image processing method, wherein the image processing method comprises:
an inputting step of inputting an image;
an area dividing step of dividing the image into a plurality of areas based on a predetermined characteristic amount to generate dividing data;
a representative position designating step of designating a representative position composed of at least one point on the image;
a shape changing step of changing a shape of a predetermined continuous area including the representative position by referring to the dividing data;
a displaying step of displaying the continuous area whose shape is changed; and
an extraction area setting step of setting the continuous area after the change in said shape changing step as an extraction area,
wherein the area dividing step comprises:
a representative color component characteristic amount extracting step of extracting at least one representative color component characteristic amount at a representative position composed of at least one point of the image; and
a labeling step of adding a first labeling value in the case where at least one of plural color space distances respectively defined between the color component characteristic amount at each point of the image and each representative color component characteristic amount is a predetermined threshold value or less, and adding a second labeling value in the case where the distance is more than the threshold value, and generating the label data as the dividing data.

18. An image processing apparatus, comprising:
inputting means for inputting an image;
area dividing means for dividing the image input by the inputting means into a plurality of areas based on predetermined characteristic amount to generate dividing data,
representative position designating means for designating a representative position composed of at least one point on the image;
shape changing means for changing a shape of a predetermined continuous area including the representative position by referring to the dividing data:
displaying means for displaying the continuous area whose shape is changed; and
extraction area determining means for determining the continuous area after the change by said shape changing means as an extraction area,
wherein the area dividing means comprises:
representative color component characteristic amount extracting means for extracting at least one representative color component characteristic amount at a representative position composed of at least one point of the image; and
labeling means for adding a first labeling value in the case where at least one of plural color space distances respectively defined between a color component characteristic amount at each point of the image and each representative color component characteristic amount is a predetermined threshold value or less, and adding a second labeling value in the case where the distance is more than the threshold value, and generating the label data as the dividing data.

19. An image processing method, comprising:
an inputting step of inputting an image;
an area dividing step of dividing the image into a plurality of areas and generating dividing data based on a first characteristic amount;
a representative position designating step of designating a representative position composed of at least one point on the image;
a shape changing step of changing a shape of a predetermined continuous area including the representative position by referring to at least one of the dividing data and a second characteristic amount;
a displaying step of displaying the continuous area whose shape is changed; and
an extraction area setting step of setting the continuous area after the change in said shape changing step as an extraction area,
wherein the shape changing step refers to the dividing data and the second characteristic amount, and
wherein the second characteristic amount that is referred to at a predetermined point of the image in the shape changing step is a color component characteristic amount, if saturation is equal to or greater than a predetermined threshold value at the point, and is one of a contrast characteristic amount, an edge strength characteristic amount and a lightness characteristic amount, if saturation is less than the threshold value at the point.

20. The image processing method according to claim 1 or 19, wherein the area dividing step determines a predetermined two valued threshold value based on a density histogram of the image, and generates as the dividing data the two valued data of the image according to the threshold value.

21. The image processing method according to claim 19, wherein the image characteristic amount is a color component characteristic amount at each point of the image.

22. The image processing method according to claim 21, wherein the color component characteristic amount is chromaticity.

23. The image processing method according to claim 19, wherein the image characteristic amount is a contrast characteristic amount at each point of the image.

24. The image processing method according to claim 19, wherein the image characteristic amount is an edge strength amount at each point of the image.

25. The image processing method according to claim 19, wherein the image characteristic amount is a texture characteristic amount at each point of the image.

26. The image processing method according to claim 19, wherein the image characteristic amount is a motion vector characteristic amount at each point of the image.

27. The image processing method according to claim 26, wherein the color component characteristic amount is chromaticity.

28. The image processing method according to claim 19, wherein the color component characteristic amount is chromaticity.

29. The image processing method according to claim 19, wherein the area dividing step determines a predetermined two valued threshold value based on a density histogram of the image, and generates as the dividing data the two valued data of the image according to the threshold value.

30. A storage medium that stores a program of an image processing method, wherein the image processing method comprises:

an inputting step of inputting an image;

an area dividing step of dividing the image in a plurality of areas and generating dividing data based on a first characteristic amount;

a representative position designating step of designating a representative position composed of at least one point on the image;

a shape changing step of changing a shape of a predetermined continuous area including the representative position by referring to at least one of the dividing data and a second characteristic amount;

a displaying step of displaying the continuous area whose shape is changed; and an extraction area setting step of setting the continuous area after the change in said shape changing step as an extraction area, wherein the shape changing step refers to the dividing data and the second characteristic amount, and wherein the second characteristic amount that is referred to at a predetermined point of the image in the shape changing step is a color component characteristic amount, if saturation is greater than or equal to a predetermined threshold value at the point, and is one of a contrast characteristic amount, an edge strength characteristic amount and a lightness characteristic amount, if saturation is less than the threshold value at the point.

31. The storage medium according to claim 30 wherein the first characteristic amount is at least one of a color component characteristic amount and a motion vector characteristic amount.

32. An image processing method, comprising:

an inputting step of inputting an image;

an area dividing step of dividing the image into a plurality of areas and generating dividing data based on a first characteristic amount;

a representative position designating step of designating a representative position composed of at least one point on the image;

a shape changing step of changing a shape of a predetermined continuous area including the representative position by referring to at least one of the dividing data and a second characteristic amount;

a displaying step of displaying the continuous area whose shape is changed; and an extraction area setting step of setting the continuous area after the change in said shape changing step as an extraction area, wherein the shape changing step refers to the dividing data and the second characteristic amount, and wherein the second characteristic amount that is referred to at a predetermined point of the image in the shape changing step is a weighted addition amount of a first characteristic amount being a color component at the point and a second characteristic amount being one of a contrast component, an edge strength component and a lightness component.

33. The image processing method according to claim 32, wherein the color component characteristic amount is chromaticity.

34. A storage medium that stores a program of an image processing method, wherein the image processing method comprises:

an inputting step of inputting an image;

an area dividing step of dividing the image in a plurality of areas and generating dividing data based on a first characteristic amount;

a representative position designating step of designating a representative position composed of at least one point on the image;

a shape changing step of changing a shape of a predetermined continuous area including the representative position by referring to at least one of the dividing data and a second characteristic amount;

a displaying step of displaying the continuous area whose shape is changed; and an extraction area setting step of setting the continuous area after the change in the shape changing step as an extraction area, wherein the shape changing step refers to the dividing data and the second characteristic amount, and wherein the second characteristic amount that is referred to at a predetermined point of the image in the shape changing step is a weighted addition amount of a first characteristic amount being a color component at the point and a second characteristic amount being one of a contrast component, an edge strength component and a lightness component.

35. The storage medium according to claim 34, wherein the first characteristic amount is at least one of a color component characteristic amount and a motion vector characteristic amount.

36. An image processing method, comprising:

an inputting step of inputting an image;

an area dividing step of dividing the image into a plurality of areas and generating dividing data based on a first characteristic amount;

a representative position designating step of designating a representative position composed of at least one point on the image;

a shape changing step of changing a shape of a predetermined continuous area including the representative position by referring to at least one of the dividing data and a second it characteristic amount;

a displaying step of displaying the continuous area whose shape is changed; and an extraction area setting step of setting the continuous area after the change in said shape changing step as an extraction area, wherein the area dividing step comprises:

a representative color component characteristic amount extracting step of extracting at least one representative color component characteristic amount at a representative position composed of at least one point of the image; and a labeling step of adding a first labeling value in the case where at least one of plural color space distances respectively defined between a color component characteristic amount at each point of the image and each representative color component characteristic amount is a predetermined threshold value or less, and adding a second labeling value in the case where the distance is more than the threshold value, and generating the label data as the dividing data.

37. A storage medium that stores a program of an image processing method, wherein the image processing method comprises:

an inputting step of inputting an image;

an area dividing step of dividing the image in a plurality of areas and generating dividing data based on a first characteristic amount;

a representative position designating step of designating a representative position composed of at least one point on the image;

a shape changing step of changing a shape of a predetermined continuous area including the representative position by referring to at least one of the dividing data and a second characteristic amount;

a displaying step of displaying the continuous area whose shape is changed; and an extraction area setting step of setting the continuous area after the change in the shape changing step as an extraction area, wherein the area dividing step comprises:

a representative color component characteristic amount extracting step of extracting at least one representative color component characteristic amount at a representative position composed of at least one point of the image; and a labeling step of adding a first labeling value in the case where at least one of plural color space distances respectively defined between a color component characteristic amount at each point of the image and each representative color component characteristic amount is a predetermined threshold value or less, and adding a second labeling value in the case where the distance is more than the threshold value, and generating the label data as the dividing data.

38. The storage medium according to claim 37, wherein the first characteristic amount is at least one of a color component characteristic amount and a motion vector characteristic amount.

39. An image processing method, comprising:

an inputting step of inputting an image:

an area dividing step of dividing the image into a plurality of areas based on a predetermined characteristic amount to generate dividing data;

a representative position designating step of designating a representative position composed of at least one point on the image;

a shape changing step of changing a shape of a predetermined continuous area including the representative position by referring to the dividing data;

a displaying step of displaying the continuous area whose shape is changed;

a convergence determining step of determining convergence of shape changing by the shape changing step; and an extraction area setting step of setting the continuous area after the change in said shape changing step as an extraction area, wherein the shape changing step refers to the dividing data and a predetermined image characteristic amount, and wherein the predetermined image characteristic amount that is referred to at a predetermined point of the image in the shape changing step is a color component characteristic amount, if saturation is greater than or equal to a predetermined threshold value at the point, and is one of a contrast characteristic amount, an edge strength characteristic amount and a lightness characteristic amount, if saturation is less than the threshold value at the point.

40. A storage medium that stores a program of an image processing method, wherein the image processing method comprises:

an inputting step of inputting an image;

an area dividing step of dividing the image into a plurality of areas based on a predetermined characteristic amount to generate dividing data;

a representative position designating step of designating a representative position composed of at least one point on the image;

a shape changing step of changing the shape of a predetermined continuous area including the representative position by referring to the dividing data;

a displaying step of displaying the continuous area whose shape is changed;

a convergence determining step of determining convergence of shape changing by the shape changing step; and an extraction area setting step of setting the continuous area after the change in said shape changing step as an extraction areas, wherein the shape changing step refers to the dividing data and a predetermined image characteristic amount, and wherein the predetermined image characteristic amount that is referred to at a predetermined point of the image in the shape changing step is a color component characteristic amount, if saturation is greater than or equal to a predetermined threshold value at the point, and is one of a contrast characteristic amount an edge strength characteristic amount and a lightness characteristic amount, if saturation is less than the threshold value at the point.

41. An image processing apparatus, comprising:

inputting means for inputting an image;

area dividing means for dividing the image input by the inputting means into a plurality of areas based on a predetermined characteristic amount to generate dividing data;

designating means for designating a representative position composed of at least one point on the image;

shape changing means for changing a shape of a predetermined continuous area including the representative position by referring to the dividing data;

displaying means for displaying the continuous area whose shape is changed;

convergence determining means for determining convergence of shape changing by the shape changing means; and extraction area setting means for setting the continuous area after the change by said shape changing means as an extraction area, wherein the shape changing means refers to the dividing data and a predetermined image characteristic amount, and wherein the predetermined image characteristic amount that is referred to at a predetermined point of the image by the shape changing means is a color component characteristic amount, if saturation is greater than or equal to a predetermined threshold value at the point, and is one of a contrast characteristic amount, an edge strength characteristic amount and a lightness characteristic amount, if saturation is less than the threshold value at the point.

42. An image processing method, comprising:

an inputting step of inputting an image:
- an area dividing step of dividing the image into a plurality of areas based on a predetermined characteristic amount to generate dividing data;
- a representative position designating step of designating a representative position composed of at least one point on the image;
- a shape changing step of changing a shape of a predetermined continuous area including the representative position by referring to the dividing data;
- a displaying step of displaying the continuous area whose shape is changed;
- a convergence determining step of determining convergence of shape changing by the shape changing step; and
- an extraction area setting step of setting the continuous area after the change in said shape changing step as an extraction area,
- wherein the shape changing step refers to the dividing data and a predetermined image characteristic amount, and
- wherein the predetermined image characteristic amount that is referred to at a predetermined point of the image in the shape changing step is a weighted addition amount of a first characteristic amount being a color component at the point and a second characteristic amount being one of a contrast component, an edge strength component and a lightness component.

43. A storage medium that stores a program of an image processing method, wherein the image processing method comprises:

an inputting step of inputting an image;

an area dividing step of dividing the image into a plurality of areas based on a predetermined characteristic amount to generate dividing data;

a representative position designating step of designating a representative position composed of at least one point on the image;

a shape changing step of changing the shape of a predetermined continuous area including the representative position by referring to the dividing data;

a displaying step of displaying the continuous area whose shape is changed;

a convergence determining step of determining convergence of shape changing by the shape changing step; and an extraction area setting step of setting the continuous area after the change in the shape changing step as an extraction area, wherein the shape changing step refers to the dividing data and a predetermined image characteristic amount, and wherein the predetermined image characteristic amount that is referred to at a predetermined point of the image in the shape changing step is a weighted addition amount of a first characteristic amount being a color component at the point and a second characteristic amount being one of a contrast component, an edge strength component and a lightness component.

44. An image processing apparatus, comprising:

inputting means for inputting an image;

area dividing means for dividing the image input by the inputting means into a plurality of areas based on a predetermined characteristic amount to generate dividing data;

designating means for designating a representative position composed of at least one point on the image;

shape changing means for changing a shape of a predetermined continuous area including the representative position by referring to the dividing data;

displaying means for displaying the continuous area whose shape is changed;

convergence determining means for determining convergence of shape changing by the shape changing means; and extraction area setting means for setting the continuous area after the change by said shape changing means as an extraction area, wherein the shape changing means refers to the dividing data and a predetermined image characteristic amount; and wherein the predetermined image characteristic amount that is referred to at a predetermined point of the image by the shape changing means is a weighted addition amount of a first characteristic amount being a color component at the point and a second characteristic amount being one of a contrast component, an edge strength component and a lightness component.

45. An image processing method, comprising: an inputting step of inputting an image:

an area dividing step of dividing the image into a plurality of areas based on a predetermined characteristic amount to generate dividing data;

a representative position designating step of designating a representative position composed of at least one point on the image;

a shape changing step of changing a shape of a predetermined continuous area including the representative position by referring to the dividing data;

a displaying step of displaying the continuous area whose shape is changed;

a convergence determining step of determining convergence of shape changing by the shape changing step; and an extraction area setting step of setting the continuous area after the change in said shape changing step as an extraction area, wherein the area dividing step comprises:

a representative color component characteristic amount extracting step of extracting at least one representative color component characteristic amount at a representative position composed of at least one point of the image; and a labeling step of adding a first labeling value in the case where at least one of plural color space distances respectively defined between a color component characteristic amount at each point of the image and each representative color component characteristic amount is a predetermined threshold value or less, and adding a second labeling value in the case where the distance is more than the threshold value, and generating the label data as the dividing data.

46. A storage medium that stores a program of an image processing method, wherein the image processing method comprises:

an inputting step of inputting an image;

an area dividing step of dividing the image into a plurality of areas based on a predetermined characteristic amount to generate dividing data;

a representative position designating step of designating a representative position composed of at least one point on the image;

a shape changing step of changing the shape of a predetermined continuous area including the representative position by referring to the dividing data;

a displaying step of displaying the continuous area whose shape is changed;

a convergence determining step of determining convergence of shape changing by the shape changing step; and an extraction area setting step of setting the continuous area after the change in the shape changing step as an extraction area, wherein the area dividing step comprises:

a representative color component characteristic amount extracting step of extracting at least one representative color component characteristic amount at a representative position composed of at least one point of the image; and a labeling step of adding a first labeling value in the case where at least one of plural color space distances respectively defined between a color component characteristic amount at each point of the image and each representative color component characteristic amount is a predetermined threshold value or less, and adding a second labeling value in the case where the distance is more than the threshold value, and generating the label data as the dividing data.

47. An image processing apparatus, comprising:

inputting means for inputting an image;

area dividing means for dividing the image input by the inputting means into a plurality of areas based on a predetermined characteristic amount to generate dividing data;

designating means for designating a representative position composed of at least one point on the image;

shape changing means for changing a shape of a predetermined continuous area including the representative position by referring to the dividing data;

displaying means for displaying the continuous area whose shape is changed;

convergence determining means for determining convergence of shape changing by the shape changing means; and extraction area setting means for setting the continuous area after the change by said shape changing means as an extraction area, wherein the area dividing means comprises:

representative color component characteristic amount extracting means for extracting at least one representative color component characteristic amount at a representative position composed of at least one point of the image; and labeling means for adding a first labeling value in the case where at least one of plural color space distances respectively defined between a color component characteristic amount at each point of the image and each representative color component characteristic amount is a predetermined threshold value or less, and adding a second labeling value in the case where the distance is more than the threshold value, and generating the label data as the dividing data.

* * * * *

UNITED STATES PATENT AND TRADEMARK OFFICE
CERTIFICATE OF CORRECTION

PATENT NO. : 6,728,400 B1
DATED : April 27, 2004
INVENTOR(S) : Masakazu Matsugu

It is certified that error appears in the above-identified patent and that said Letters Patent is hereby corrected as shown below:

Title page,
Item [56], References Cited, OTHER PUBLICATIONS,
"Pavlidis et al," reference, "PAtterm" should read -- Pattern --; and
"Belongie et al.," reference, "usgin" should read -- using --.
Item [57], ABSTRACT,
Line 2, "a indication" should read -- an indication --; and
Line 22, "In" should read -- in --.

Column 7,
Line 16, "In" should read -- in --.

Column 8,
Line 37, "from;" should read -- from, --.

Column 11,
Line 20, "of course" should read -- Of course --.
Line 40, "Is" should read -- is --.

Column 14,
Line 55, "Is" should read -- is --.

Column 15,
Line 3, "Interface" should read -- interface --.
Line 12, "(S91)" should read -- (S91). --.
Line 60, "an neighborhood" should read -- a neighborhood --.

Column 16,
Line 54, "comprises;" should read -- comprises, --.

Column 18,
Line 11, "comprises;" should read -- comprises, --.

Column 19,
Line 1, "comprising" should read -- comprising, --.

Column 21,
Line 58, "claim 30" should read -- claim 30, --.

UNITED STATES PATENT AND TRADEMARK OFFICE
CERTIFICATE OF CORRECTION

PATENT NO. : 6,728,400 B1
DATED : April 27, 2004
INVENTOR(S) : Masakazu Matsugu

It is certified that error appears in the above-identified patent and that said Letters Patent is hereby corrected as shown below:

Column 23,
Line 4, "it" should be deleted.

Column 24,
Line 49, "areas," should read -- area, --.
Line 57, "amount" should read -- amount, --.

Column 26,
Line 51, "an" should begin a new paragraph.
Line 52, "image," should read -- image; --.

Signed and Sealed this

Third Day of May, 2005

JON W. DUDAS
*Director of the United States Patent and Trademark Office*